US012612063B2

(12) United States Patent
Bok

(10) Patent No.: US 12,612,063 B2
(45) Date of Patent: Apr. 28, 2026

(54) VEHICLE CONTROL SYSTEM

(71) Applicant: Samsung Display Co., LTD., Yongin-si (KR)

(72) Inventor: Seung Lyong Bok, Yongin-si (KR)

(73) Assignee: Samsung Display Co., LTD., Gyeonggi-do (KR)

( * ) Notice: Subject to any disclaimer, the term of this patent is extended or adjusted under 35 U.S.C. 154(b) by 172 days.

(21) Appl. No.: 18/495,964

(22) Filed: Oct. 27, 2023

(65) Prior Publication Data

US 2024/0351603 A1      Oct. 24, 2024

(30) Foreign Application Priority Data

Apr. 20, 2023     (KR) ........................ 10-2023-0052173

(51) Int. Cl.
*B60W 50/14*              (2020.01)

(52) U.S. Cl.
CPC ....... *B60W 50/14* (2013.01); *B60W 2050/146* (2013.01)

(58) Field of Classification Search
CPC .. B60W 50/14; B60W 2050/146; G08G 1/00; B60Q 9/00
USPC ........................................................... 701/1
See application file for complete search history.

(56) References Cited

U.S. PATENT DOCUMENTS 9,851,855 B2     12/2017  Bok
10,800,428 B2    10/2020  Bae et al.

| | | | |
|---|---|---|---|
| 11,231,768 B1 * | 1/2022 | Cheng | G06F 1/3262 |
| 12,065,176 B2 * | 8/2024 | Yoshida | B60W 60/0016 |
| 2011/0242015 A1 * | 10/2011 | Lou | G06F 3/0416 345/173 |
| 2018/0039367 A1 * | 2/2018 | Suzuki | G06F 3/0445 |
| 2019/0102008 A1 * | 4/2019 | Takada | G06F 3/0412 |
| 2023/0049671 A1 * | 2/2023 | Cheng | B60W 50/14 |
| 2024/0028156 A1 * | 1/2024 | Dai | G06F 3/04166 |
| 2024/0199053 A1 * | 6/2024 | Tsujino | B60K 35/23 |
| 2025/0224829 A1 * | 7/2025 | Kim | G06F 3/04166 |

FOREIGN PATENT DOCUMENTS

| GB | 2560079 A | * | 8/2018 | ............. G06F 21/32 |
| KR | 10-2368812 | | 2/2022 | |

* cited by examiner

*Primary Examiner* — Tuan C To

(74) *Attorney, Agent, or Firm* — HARNESS, DICKEY & PIERCE, P.L.C.

(57)          ABSTRACT

A vehicle control system includes: a first display unit including a first display area in which an image is displayed; a first touch unit including a first touch area that includes at least a portion overlapping the first display area and receives a touch of a user; a second display unit including a second display area in which the image is displayed; a second touch unit including a second touch area that includes at least a portion overlapping the second display area and receives the touch of the user; a vehicle drive unit that drives a vehicle; a main controller that controls the vehicle drive unit, based on the touch of the user; a main power unit that supplies a main power to the first touch unit and the main controller; and a first auxiliary power unit the supplies a first auxiliary power to the second touch unit.

14 Claims, 34 Drawing Sheets

VEHICLE CONTROL SYSTEM

CROSS-REFERENCE TO RELATED APPLICATION(S)

The application claims priority to and benefits of Korean patent application No. 10-2023-0052173 under 35 U.S.C. § 119, filed on Apr. 20, 2023, in the Korean Intellectual Property Office, the entire contents of which are incorporated herein by reference.

BACKGROUND

1. Technical Field

Embodiments relate to a vehicle control system, and more particularly, to a vehicle control system including a display unit and a touch unit.

2. Description of the Related Art

A vehicle is an apparatus transporting a user who gets therein. An automobile may be a representative example of the vehicle. Recently, for convenience of a user who uses a vehicle, various types of sensors, electronic devices, and the like have been provided in the vehicle. A display unit for displaying an image and a touch unit for receiving a touch of the user are provided inside the vehicle. However, electronic devices provided in the vehicle may be damaged by external impact. In case that the electronic devices are damaged, the user may lose the right of control over the vehicle.

SUMMARY

Embodiments provide a vehicle control system capable of divisionally driving a display unit and/or a touch unit.

However, embodiments of the disclosure are not limited to those set forth herein. The above and other embodiments will become more apparent to one of ordinary skill in the art to which the disclosure pertains by referencing the detailed description of the disclosure given below.

In accordance with an aspect of the disclosure, there is provided a vehicle control system including: a first display unit including a first display area in which an image is displayed; a first touch unit including a first touch area that includes at least a portion overlapping the first display area and receives a touch of a user; a second display unit including a second display area in which the image is displayed; a second touch unit including a second touch area that includes at least a portion overlapping the second display area and receives the touch of the user; a vehicle drive unit that drives a vehicle; a main controller that controls the vehicle drive unit, based on the touch of the user; a main power unit that supplies a main power to the first touch unit and the main controller; and a first auxiliary power unit that supplies a first auxiliary power to the second touch unit.

The first display area may be closer to a driver seat of the vehicle than the second display area.

The first display area may be integral with the vehicle, and the second display area may be formed as an electronic device that is separated from the vehicle.

The vehicle drive unit may include: first vehicle drive units that drive first devices of the vehicle; and second vehicle drive units that drive second devices of the vehicle, which are different from the first devices. The vehicle control system may further include a first auxiliary controller that controls the second vehicle drive units in response to the touch of the user detected by the second touch unit.

The second devices may include at least one of a power source, a steering device, a brake device, a window device, an airbag device, and a sunroof device.

The first auxiliary power unit may be configured to supply the first auxiliary power to the first auxiliary controller.

The vehicle drive unit may include: first vehicle drive units that drive first devices of the vehicle; and second vehicle drive units that drive second devices of the vehicle, which are different from first devices. The vehicle control system may further include: an auxiliary vehicle drive unit that drives the second devices; and a first auxiliary controller that controls the auxiliary vehicle drive unit in response to the touch of the user detected by the second touch unit.

The first display unit may further include a first display area driver that drives first sub-pixels of the first display area, and the second display unit may further include a second display area driver that drives first sub-pixels of the second display area. The first touch unit may further include a first touch area driver that drives touch electrodes of the first touch area, and the second touch unit may further include a second touch area driver that drives touch electrodes of the second touch area.

The second touch unit may include: a force sensor disposed in at least a portion of the second touch area; and a force sensor driver that drives the force sensor.

The second display unit may be configured to display an emergency switch in a portion of the second display area, which overlaps the at least a portion of the second touch area.

The vehicle control system may further include: a third display unit including a third display area in which the image is displayed; a third touch unit including a third touch area that includes at least a portion overlapping the third display area and receives the touch of the user; and a second auxiliary power unit that supplies a second auxiliary power to the third touch unit.

The vehicle control system may further include an emergency sensing unit that enable the vehicle to be operated in an emergency mode, based on at least one of a state of the vehicle and a state of a driver of the vehicle.

The first display unit may be configured to display a first user interface including driving switches in the first display area. The second display unit may be configured to display a second user interface, which is different from the first user interface in the emergency mode of the vehicle.

The second user interface may include some of the driving switches.

In accordance with another aspect of the disclosure, there is provided a vehicle control system including: an emergency sensing unit that enable a vehicle to be operated in an emergency mode, based on a state of the vehicle and a state of a driver of the vehicle; a first display unit including a first display area including first sub-pixels; a first touch unit including a first touch area that includes at least a portion overlapping the first display area and receives a touch of a user; a second display unit including a second display area including the first sub-pixels and an auxiliary display area including second light emitting elements of second sub-pixels, driven in the emergency mode; a second touch unit including a second touch area that includes at least a portion overlapping the second display area and receives the touch of the user; a vehicle drive unit that drives the vehicle; and a main controller that controls the vehicle drive unit, based on the touch of the user.

Second pixel driving circuits of the second sub-pixels, which drive the second light emitting elements, may be disposed in a non-display area adjacent to the second display area.

The auxiliary display area may be included in the second display area. Each of the second light emitting elements may be disposed between first light emitting elements of the first sub-pixels.

In accordance with still another aspect of the disclosure, there is provided a vehicle control system including: an emergency sensing unit that enable a vehicle to be operated in an emergency mode, based on a state of the vehicle and a state of a driver of the vehicle; a first display unit including a first display area in which an image is displayed; a first touch unit including touch electrodes that include at least a portion overlapping the first display area and receive a touch of a user; a second display unit including a second display area in which the image is displayed; a second touch unit including a second touch area including the touch electrodes which have at least a portion overlapping the second display area and receive the touch of the user and an auxiliary touch area including auxiliary touch electrodes that receive the touch of the user in the emergency mode; a vehicle drive unit that drives the vehicle; and a main controller that controls the vehicle drive unit, based on the touch of the user.

At least one of the auxiliary touch electrodes may form a force sensor.

At least one of the auxiliary touch electrodes may include a portion that is cut from at least one of the touch electrodes to be separated from the touch electrodes.

BRIEF DESCRIPTION OF THE DRAWINGS

Embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that in case that an element is referred to as being "between" two elements, it may be the only element between the two elements, or one or more intervening elements may also be present. Like reference numerals refer to like elements throughout.

FIG. 4 is a schematic diagram illustrating an example of a first display unit and a second display unit of the vehicle control system shown in FIG. 2.

FIG. 10 is a schematic diagram illustrating an example of a first touch unit and a second touch unit of the vehicle control system shown in FIG. 2.

FIG. 20 is a schematic diagram illustrating an example of a first display unit, a second display unit, and a third display unit of the vehicle control system shown in FIG. 19.

FIG. 21 is a schematic diagram illustrating an example of a first touch unit, a second touch unit, and a third touch unit of the vehicle control system shown in FIG. 19.

FIG. 27 is a schematic diagram illustrating a first display unit and a second display unit of a vehicle control system in accordance with embodiments.

FIG. 33 is a schematic diagram illustrating a first touch unit and a second touch unit of a vehicle control system in accordance with embodiments.

DETAILED DESCRIPTION OF THE EMBODIMENTS

Figure 1:
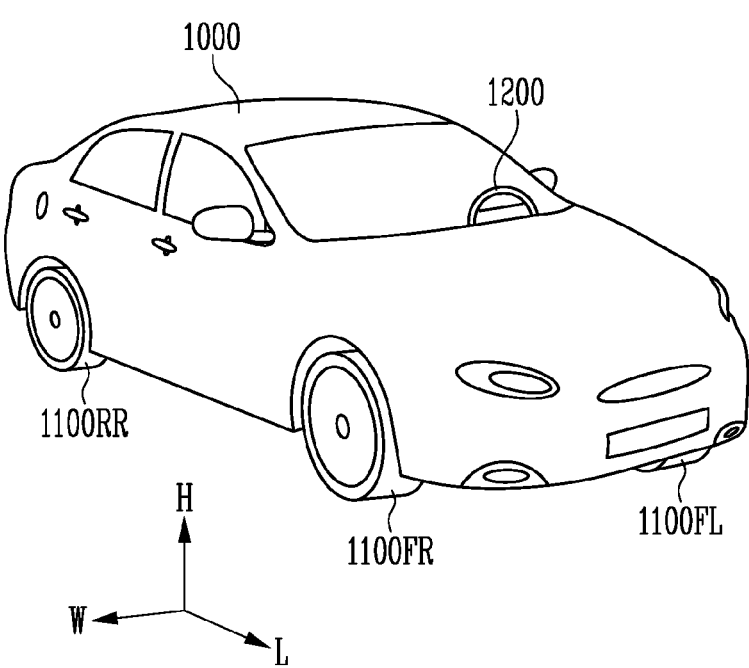
FIG. 1 is a schematic diagram illustrating an example of an appearance of a vehicle in which a vehicle control system is mounted.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

Unless otherwise specified, the illustrated embodiments are to be understood as providing features of the invention. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the invention.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the X, Y, and Z-axes, and may be interpreted in a broader sense. For example, the D1-axis, the D2-axis, and the D3-axis may be perpendicular to one another, or may represent different directions that are not perpendicular to one another. Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be perpendicular to one another, or may represent different directions that are not perpendicular to one another. For the purposes of this disclosure, "at least one of A and B" may be construed as understood to mean A only, B only, or any combination of A and B. Also, "at least one of X, Y, and Z" and "at least one selected from the group consisting of X, Y, and Z" may be construed as X only, Y only, Z only, or any combination of two or more of X, Y, and Z. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the invention. Further, the blocks, units, and/or modules of some embodiments may be physically combined into more complex blocks, units, and/or modules without departing from the scope of the invention.

FIG. 1 is a schematic diagram illustrating an example of an appearance of a vehicle in which a vehicle control system 1000 is mounted.

Referring to FIG. 1, a vehicle may include wheels 1100FR, 1100FL, 1100RR, and 1100RL, which are rotated by a power source, and a steering input part 1200 for controlling an advancing direction of the vehicle.

An overall length means a length from a front end portion to a rear end portion of the vehicle, an overall width means a width of the vehicle, and overall height means a length from a bottom of a wheel to a roof. In the following description, an overall length direction L is a direction which becomes a criterion for measuring the overall length of the vehicle, and may be a direction facing from the rear end portion to the front end portion of the vehicle. An overall width direction W is a direction which becomes a criterion for measuring the overall width of the vehicle, and may be a direction facing from a front left wheel 1100FL of the vehicle to a front right wheel 1100FR of the vehicle. An overall height direction H is a direction which becomes a criterion for measuring the overall height of the vehicle, and may be a direction facing from the bottom of the wheel to the roof.

In an embodiment, the vehicle may include a vehicle control system 1000 therein.

Figure 2:
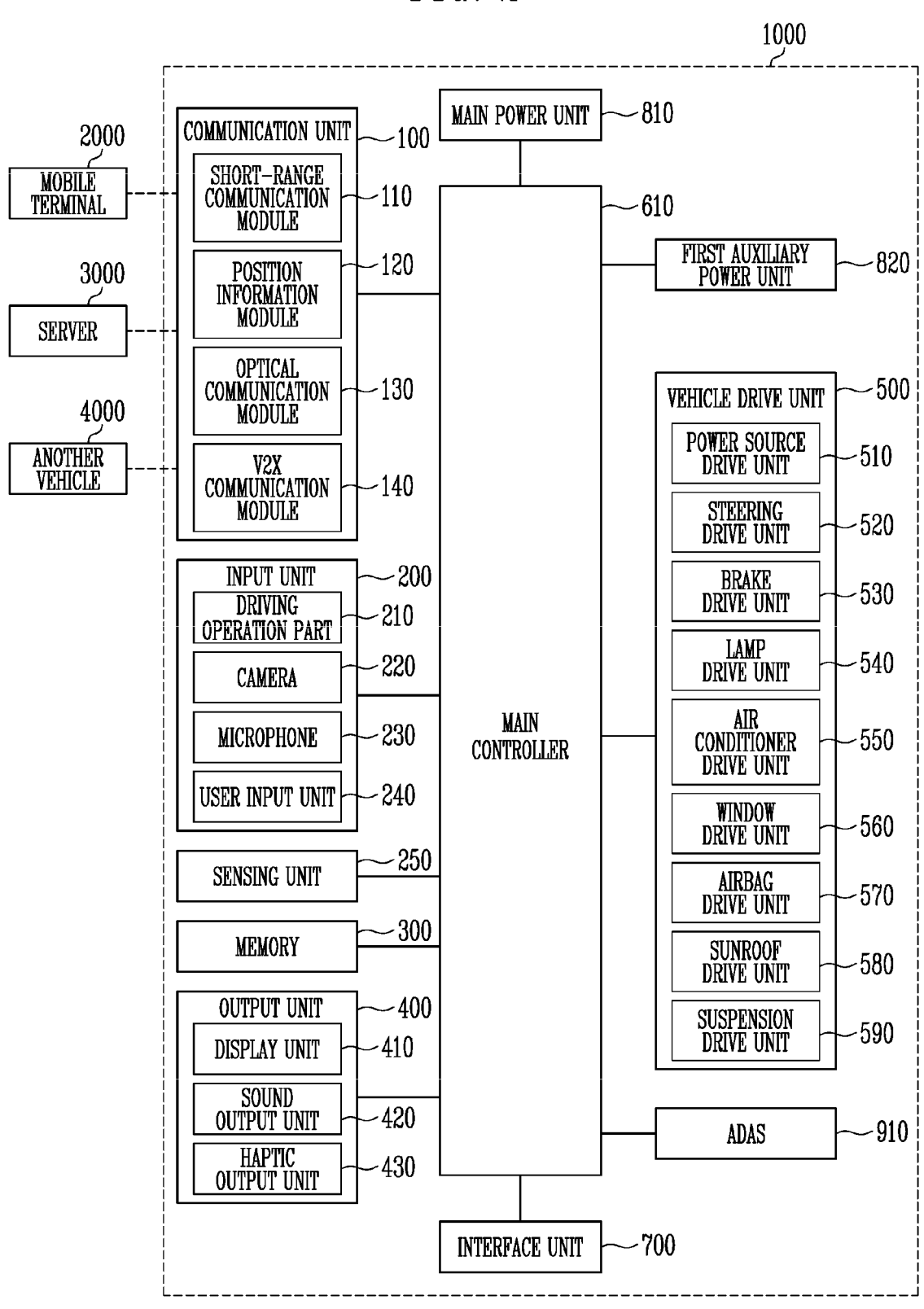
FIG. 2 is a schematic block diagram illustrating a vehicle control system in accordance with embodiments.
Figure 3:
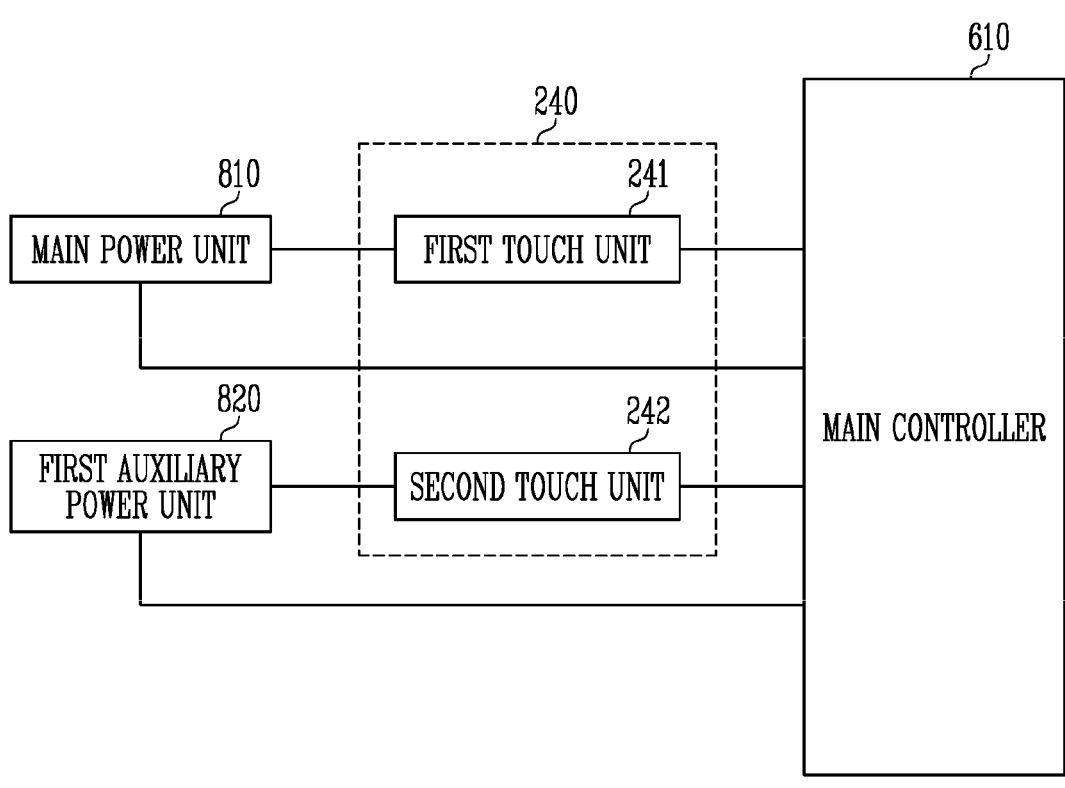
FIG. 3 is a schematic block diagram illustrating an example of operations of a main power unit and a first auxiliary power unit of the vehicle control system shown in FIG. 2.

FIG. 2 is a schematic block diagram illustrating a vehicle control system 1000 in accordance with embodiments. FIG. 3 is a schematic block diagram illustrating an example of operations of a main power unit 810 and a first auxiliary power unit 820 of the vehicle control system 1000 shown in FIG. 2.

Referring to FIG. 2, the vehicle control system 1000 may include a communication unit 100, an input unit 200, a sensing unit 250, a memory 300, an output unit 400, a vehicle drive unit 500, a main controller 610, an interface unit 700, a main power unit 810, a first auxiliary power unit 820, and an Advanced Driver Assistance System (ADAS) 910.

The communication unit 100 may include a short-range communication module 110, a position information module 120, an optical communication module 130, and a V2X communication module 140.

The short-range communication module 110 may be used for short-range communication, and may support the short-range communication, using at least one of technologies including BLUETOOTH™, Radio Frequency Identification (RFID), Infrared Data Association (IrDA), Ultra-WideBand (UWB), ZigBee, Near Field Communication (NFC), Wireless-Fidelity (Wi-Fi), Wi-Fi Direct, and Wireless Universal Serial Bus (USB).

The short-range communication module 110 may form a short-range wireless area network, thereby performing short-range communication between the vehicle control system 1000 and at least one external device. For example, the short-range communication module 110 may exchange data with a mobile terminal 2000 by wireless. The short-range communication module 110 may receive whether information and traffic situation information of roads (e.g., a Transport Protocol Expert Group (TPEG)) from the mobile terminal 2000. In case that a user gets in a vehicle, the mobile terminal 2000 of the user and the vehicle control system 1000 may perform pairing with each other automatically or by execution of an application of the user.

The position information module 120 may be a module for acquiring a position of the vehicle. For example, the position information module 120 may be a Global Positioning System (GPS) module. For example, in case that the vehicle uses the GPS module, a position of the vehicle may be acquired by using a signal transmitted from a GPS satellite.

In an embodiment, the position information module 120 may not be a component included in the communication unit 100 but may be a component included in the sensing unit 250.

The optical communication module 130 may include a light transmitting unit and a light receiving unit.

The light receiving unit may convert a light signal into an electrical signal, thereby receiving information. The light receiving unit may include a photo diode for receiving light. The photo diode may convert light into an electrical signal. For example, the light receiving unit may receive information of a forward vehicle through light emitted from a light source included in the forward vehicle.

The light transmitting unit may include at least one light emitting element for converting an electrical signal into a light signal. For example, the light emitting element may be a Light Emitting Diode (LED). The light transmitting unit may convert an electrical signal into a light signal, thereby transmitting the light signal to the outside. For example, the light transmitting unit may transmit the light signal to the outside through flickering of a light emitting element corresponding to a certain frequency. In an embodiment, the light transmitting unit may include light emitting element arrays. In an embodiment, the light transmitting unit may be integral with a lamp provided in the vehicle. For example, the light transmitting unit may be at least one of a headlight, a taillight, a stop lamp, a turn signal lamp, and a sidelight. For example, the optical communication module 130 may exchange data with another vehicle 4000 through optical communication.

The V2X communication module 140 may be a module for performing wireless communication with a server 3000 or the other vehicle 4000. The V2X communication module 140 may include a module in which a vehicle-to-vehicle communication (V2V) protocol or a vehicle-to-infrastructure communication (V2I) protocol may be implemented. The vehicle control system 1000 may perform wireless communication with the server 3000 and the other vehicle 4000 through the V2X communication module 140.

The input unit 200 may include a driving operation part 210, a camera 220, a microphone 230, and a user input unit 240.

The driving operation part 210 may receive a user input for vehicle driving. The driving operation part 210 may include a steering input part 1200, a shift input part, an acceleration input part, and a brake input part.

The steering input part 1200 may receive an advancing direction input from the user. The steering input part 1200 may be formed in a wheel shape such that a steering input is generated by rotation. In an embodiment, the user input unit 240 may perform a function of the steering input part 1200. For example, the steering input part 1200 may be formed as a touch screen, a touch pad, or a button.

The shift input part may receive an input of parking, forward gear, neutral gear, and backward gear of the vehicle from the user. The shift input part may be formed in a lever shape. In an embodiment, the user input unit 240 may perform a function of the shift input part. For example, the shift input part may be formed as a touch screen, a touch pad, or a button.

The acceleration input part may receive an input for acceleration of the vehicle from the user. The brake input part may receive an input for deceleration of the vehicle from the user. The acceleration input part and the brake input part may be formed in a pedal shape. For example, the acceleration input part and/or the brake input part may be formed as a touch screen, a touch pad, or a button.

The camera 220 may include an image sensor and an image processing module. The camera 220 may process a still image or a moving image, which is obtained by the image sensor (e.g., a CMOS or a CCD). The image processing module may extract information by processing the still image or the moving image, which is acquired through the image sensor, and may transfer the extracted information to the main controller 610.

In an embodiment, the vehicle control system 1000 may include a front camera which photographs a vehicle front image, an around view camera which photographs a vehicle peripheral image, and an internal camera which photographs a vehicle internal image. Each camera may include a lens, an image sensor, and a processor. The processor may generate data or information by computer-processing a photographed image, and may transfer the generated data or information to the main controller 610.

The processor included in the camera 220 may be controlled by the main controller 610.

The processor included in the camera 220 may be implemented in a hardware manner by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electrical units for performing other functions.

The front camera may include a stereo camera. The processor of the camera may detect a distance from an object, a relative speed with an object detected in an image, and a distance between objects by using a disparity difference detected in a stereo image.

The front camera may include a Time of Flight (TOF) camera. The camera 220 may include a light source (e.g., infrared light or laser) and a receiver. The processor of the camera may detect a distance from an object, a relative speed with an object, and a distance between objects, based on a time required until infrared light or laser, emitted from the light source, is reflected from an object and is received.

The around view camera may include a plurality of cameras. For example, the plurality of cameras may be disposed at a left side, a rear end, a right side, and a front end.

In an embodiment, a left camera may be disposed in a case surrounding a left side mirror. In an embodiment, the left camera may be disposed at the outside of the case surrounding the left side mirror. In an embodiment, the left camera may be disposed in an area of the outside of a left front door, a left rear door, or a left fender.

In an embodiment, a right camera may be disposed in a case surrounding a right side mirror. In an embodiment, the right camera may be disposed at the outside of the case surrounding the right side mirror. In an embodiment, the right camera may be disposed in an area of the outside of a right front door, a right rear door, or a right fender.

In an embodiment, a rear camera may be disposed in the vicinity of a rear license plate, a trunk, or a tail gate switch.

In an embodiment, a front camera may be disposed in the vicinity of an emblem or a radiator grill.

Images respectively photographed by the plurality of cameras may be transferred to the processor of the camera, and the processor may generate a vehicle peripheral image by synthesizing the images. The vehicle peripheral image may be displayed as a top view image or a bird eye image through a display unit 410.

The internal camera may photograph an inside area of the vehicle. The internal camera may acquire an image of a passenger.

The processor of the internal camera may acquire an image of passengers in the vehicle, thereby detecting how many passengers get in the vehicle and which place each passenger is positioned. For example, the internal camera may detect whether a fellow passenger gets in the vehicle and a position at which the fellow passenger gets in the vehicle.

The internal camera may acquire an image for biometric identification of a passenger. The processor of the internal camera may check an identification (ID) of the passenger, based on a face image of the passenger.

In an embodiment, the processor of the internal camera may detect a type of the passenger, based on the image of the passenger. For example, the processor of the internal camera may detect whether the type of a driver is an old person, a disabled person, or a pregnant woman through a certain image processing algorithm.

The microphone 230 may process an external sound signal into electrical data. The processed data may be variously used according to a function that is performed in the vehicle control system 1000. The microphone 230 may convert a voice command of the user into electrical data. The converted electrical data may be transferred to the main controller 610.

In an embodiment, the camera 220 or the microphone 230 may not be a component included in the input unit 200 but may be a component included in the sensing unit 250.

The user input unit 240 may be used to receive information from the user. In case that information is input through the user input unit 240, the main controller 610 may control an operation of the vehicle control system 1000 to correspond to the input information. The user input unit 240 may include a touch input part or a mechanical input part. In an embodiment, the user input unit 240 may be disposed in an area of a steering wheel. The driver may manipulate the user input unit 240 with a finger in a state in which the driver holds the steering wheel.

The user input unit 240 may include a touch unit. This will be described in detail below.

The sensing unit 250 may sense various situations of the vehicle. For example, the sensing unit 250 may include a collision sensor, a wheel sensor, a speed sensor, a gradient sensor, a weight sensor, a heading sensor, a yaw sensor, a gyro sensor, a position module, a vehicle forward/backward movement sensor, a battery sensor, a fuel sensor, a tire sensor, a steering sensor based on the rotation of a steering wheel, a vehicle interior temperature sensor, a vehicle interior humidity sensor, an ultrasonic sensor, an illuminance sensor, a radar, Lidar, and the like.

For example, the sensing unit 250 may obtain sensing signals with respect to vehicle collision information, vehicle travel direction information, vehicle location information (GPS information), vehicle angle information, vehicle speed information, vehicle acceleration information, vehicle tilt information, vehicle forward/backward movement information, battery information, fuel information, tire information, vehicle lamp information, vehicle interior temperature information, vehicle interior humidity information, steering wheel rotation angle information, vehicle external illuminance information, and the like.

In an embodiment, the sensing unit 250 may further include an accelerator pedal sensor, a pressure sensor, an engine speed sensor, an air flow-rate sensor, an air temperature sensor, a water temperature sensor, a throttle position sensor, a Top Dead Center (TDC) sensor, a crank angle sensor, and the like.

In an embodiment, the position information module 120 may be classified as a lower component of the sensing unit 250. The camera 220 may be classified as a lower component of the sensing unit 250.

The memory 300 may be electrically connected to the main controller 610. The memory 300 may store basic data for each unit, may control data for operation control of the unit, and may input/output data. The memory 300 may be various hardware storage devices such as a ROM, a RAM, an EPROM, a flash drive, and a hard drive. The memory 300 may store various data for overall operations of the vehicle control system 1000, such as programs for processing or control of the main controller 610.

The output unit 400 may be used to output information processed by the main controller 610, and may include the display unit 410, a sound output unit 420, and a haptic output unit 430.

The display unit 410 may display information processed by the main controller 610. For example, the display unit 410 may display vehicle associated information. The vehicle associated information may include vehicle control information for direct control of the vehicle or vehicle driving assistance information for driving guide to the vehicle driver. For example, the vehicle associated information may include vehicle state information informing a current state of the vehicle or vehicle operation information associated with an operation of the vehicle.

The display unit 410 may include at least one of a Liquid Crystal Display (LCD), a Thin Film Transistor-Liquid Crystal Display (TFT LCD), an Organic Light Emitting Diode (OLED), a flexible display, a 3D display, and an e-ink display.

The display unit 410 may be formed in a mutual layer structure with the touch unit or be integral with the touch unit, to implement a touch screen. The touch screen may function as the user input unit 240 which provides an input interface between the vehicle control system 1000 and the user, and simultaneously, provide an output interface between the vehicle control system 1000 and the user. The display unit 410 may include a touch electrode for sensing a touch to the display unit 410, to receive a control command according to a touch method. In case that a touch is input to the display unit 410 by using the touch electrode, the touch electrode may sense the touch, and the main controller 610 may generate a control command corresponding to the touch, based on the touch. Contents input according to the touch method may be characters or numbers, instructions in various modes, assignable menu items, or the like.

In an embodiment, the display unit 410 may include a cluster such that the driver may check vehicle state information or vehicle operation information while driving the vehicle. The cluster may be positioned on a dashboard. The driver may check information displayed on the cluster with keeping the driver's eyes on the front of the vehicle.

In an embodiment, the display unit 410 may be implemented as a Head Up Display (HUD). In case that the display unit 410 is implemented as an HUD, information may be output through a transparent display provided at a windshield. In an embodiment, the display unit 410 may include a projector module to output information through an image projected to the windshield.

In an embodiment, the display unit 410 may include a transparent display. The transparent display may be attached to the windshield.

The transparent display may display a certain screen having a certain transparency. In order for the transparent display to have transparency, the transparent display may include at least one of a transparent Thin Film Electroluminescent (TFEL), a transparent Organic Light Emitting Diode (OLED), a transparent Liquid Crystal Display (LCD), a transmissive transparent display, and a transparent Light Emitting Diode (LED) display. The transparency of the transparent display may be adjusted.

The sound output unit 420 may convert an electrical signal from the main controller 610 into an audio signal and may output the converted audio signal. For example, the sound output unit 420 may be provided with a speaker and the like. The sound output unit 420 may output a sound corresponding to an operation of the user input unit 240.

The haptic output unit 430 may generate a haptic output. For example, the haptic output unit 430 may be operated to enable the user to recognize an output by vibrating the steering wheel, a seat belt, and a seat.

The vehicle drive unit 500 may drive the vehicle. For example, the vehicle drive unit 500 may control operations of various types of devices of the vehicle. The vehicle drive unit 500 may include a power source drive unit 510, a steering drive unit 520, a brake drive unit 530, a lamp drive unit 540, an air conditioner drive unit 550, a window drive unit 560, an airbag drive unit 570, a sunroof drive unit 580, and a suspension drive unit 590.

The power source drive unit 510 may perform electronic control for a power source in the vehicle.

In an embodiment, in case that a fossil fuel based engine is a power source, the power source drive unit 510 may perform electronic control of the engine. Therefore, the vehicle control system 1000 may control an output torque of the engine, or the like. In case that the power source drive unit 510 is the engine, the power source drive unit 510 may control the speed of the vehicle by limiting the output torque of the engine under the control of the main controller 610.

In an embodiment, in case that an electric motor is a power source, the power source drive unit 510 may perform control for the motor. Therefore, the vehicle control system 1000 may control a revolution per minute (RPM), a torque, and the like of the motor.

The steering drive unit 520 may perform electronic control of a steering apparatus in the vehicle. Therefore, the steering drive unit 520 may change an advancing direction of the vehicle.

The brake drive unit 530 may perform electronic control of a brake apparatus in the vehicle. In an embodiment, the brake drive unit 530 may reduce the speed of the vehicle by controlling operations of brakes positioned at wheels. In an embodiment, the brake drive unit 530 may adjust the advancing direction of the vehicle leftward or rightward by differentiating operations of brakes respectively positioned at left and right wheels.

The lamp drive unit 540 may control turn-on/turn-off of lamps disposed at the inside and the outside of the vehicle. The lamp drive unit 540 may control the intensity and direction of light of each lamp. For example, the lamp drive unit 540 may perform control for a turn signal, a stop lamp, or the like.

The air conditioner drive unit 550 may perform electronic control of an air conditioner in the vehicle. For example, in case that the interior temperature of the vehicle is high, the air conditioner drive unit 550 may control the air conditioner to supply cold air to the interior of the vehicle.

The window drive unit 560 may perform electronic control of a window apparatus in the vehicle. For example, the window drive unit 560 may control the opening operation or the closing operation of left and right windows of the vehicle.

The airbag drive unit 570 may perform electronic control of an airbag apparatus in the vehicle. For example, the airbag drive unit 570 may control an airbag to be deployed in case that the vehicle is put in a dangerous situation.

The sunroof drive unit 580 may perform electronic control of a sunroof apparatus in the vehicle. For example, the sunroof drive unit 580 may control the opening operation or the closing operation of a sunroof.

The suspension drive unit 590 may perform electronic control of a suspension apparatus in the vehicle. For example, in case that the road surface is uneven, the suspension drive unit 590 may control the suspension apparatus to reduce vibration of the vehicle.

The main controller 610 may control overall operations of each unit in the vehicle control system 1000. The main controller 610 may be referred to as an Electronic Control Unit (ECU).

The main controller 610 may be implemented in a hardware manner by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electrical units for performing other functions. This is substantially the same as a first auxiliary controller (e.g., 620 shown in FIG. 14) and a second auxiliary controller (e.g., 630 shown in FIG. 22), which will be described below.

The interface unit 700 may function as a passage for various types of external devices connected to the vehicle control system 1000. For example, the interface unit 700 may be provided with a port to be connected to the mobile terminal 2000. The interface unit 700 may connect the mobile terminal 2000 and the vehicle control system 1000 to each other through the port. The interface unit 700 may exchange data with the mobile terminal 2000.

In an embodiment, the interface unit 700 may function as a passage for supplying electrical energy to the mobile terminal 2000 connected therethrough. In case that the mobile terminal 2000 is electrically connected to the interface unit 700, the interface unit 700 may provide electrical energy supplied from the main power unit 810 to the mobile terminal 2000 under the control of the main controller 610.

The main power unit 810 may supply power for an operation of each component under the control of the main controller 610. For example, the main power unit 810 may be supplied with a power from a battery inside the vehicle.

In an embodiment, the main power unit 810 may supply (e.g., directly supply) power for an operation of each component without the control of the main controller 610.

The ADAS 910 may include an Autonomous Emergency Braking (AEB) module, a Forward Collision Warning (FCW) module, a Lane Departure Warning (LDW) module, a Lane Keeping Assist (LKA) module, a Speed Assist System (SAS) module, a Traffic Sign Recognition (TSR) module, a high Beam Assist (HBA) module, a Blind Spot Detection (BSD) module, an Autonomous Emergency Steering (AES) module, a Curve Speed Warning System (CSWS) module, an Adaptive Cruise Control (ACC) module, a Smart Parking Assist System (SPAS) module, a Traffic Jam Assist (TJA) module, and an Around View Monitor (AVM) module.

Each module of the ADAS 910 may include a processor for control of an advanced driver assistance function.

The processor included in each module of the ADAS 910 may be controlled by the main controller 610.

The processor of each module of the ADAS 910 may be implemented in a hardware manner by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electrical units for performing other functions. This is substantially the same as a first auxiliary controller (620 shown in FIG. 14) and a second auxiliary controller (630 shown in FIG. 22), which will be described below.

The ADAS 910 may provide the output unit 400 or the vehicle drive unit 500 with a control signal for performing each advanced driver assistance function, based on data acquired from the input unit 200 or the sensing unit 250. In an embodiment, the ADAS 910 may output (e.g., directly output) the control signal to the output unit 400 or the vehicle drive unit 500 through network communication (e.g., CAN) inside the vehicle. In an embodiment, the ADAS 910 may output the control signal to the output unit 400 or the vehicle drive unit 500 via the main controller 610.

Referring to FIGS. 1 to 3, the user input unit 240 may include a first touch unit 241 and a second touch unit 242. The first touch unit 241 and the second touch unit 242 may receive a touch of the user, and the main controller 610 may control the vehicle drive unit 500, based on the touch of the user.

The main power unit 810 may supply a main power to the first touch unit 241 and the main controller 610. The main power may be power output from the main power unit 810.

In an embodiment, the main power unit 810 may supply a power to the first touch unit 241 under the control of the main controller 610. In an embodiment, the main power unit

810 may supply a power to the first touch unit 241 without the control of the main controller 610.

The first auxiliary power unit 820 may supply a first auxiliary power to the second touch unit 242 and the main controller 610. The first auxiliary power may be power output from the first auxiliary power unit 820. For example, the first auxiliary power unit 820 may be supplied with a power from the battery inside the vehicle.

In an embodiment, the first auxiliary power unit 820 may supply a power to the second touch unit 242 under the control of the main controller 610. In an embodiment, the first auxiliary power unit 820 may supply a power to the second touch unit 242 without the control of the main controller 610.

In an embodiment, a first display unit (e.g., 411 shown in FIG. 4) and a second display unit (e.g., 412 shown in FIG. 4), which will be described below) may be supplied with the main power. In an embodiment, the first display unit (e.g., 411 shown in FIG. 4) may be supplied with the main power, and the second display unit (e.g., 412 shown in FIG. 4) may be supplied with the first auxiliary power. In an embodiment, the second display unit (e.g., 412 shown in FIG. 4) may be supplied with the first auxiliary power in an emergency mode which will be described below, and be supplied with the main power in a mode except the emergency mode.

As described above, the vehicle control system 1000 may supply powers from different power units to the first touch unit 241 and the second touch unit 242. Accordingly, although the main power unit 810 is damaged, the second touch unit 242 and the main controller 610 may be normally operated.

Figure 4:
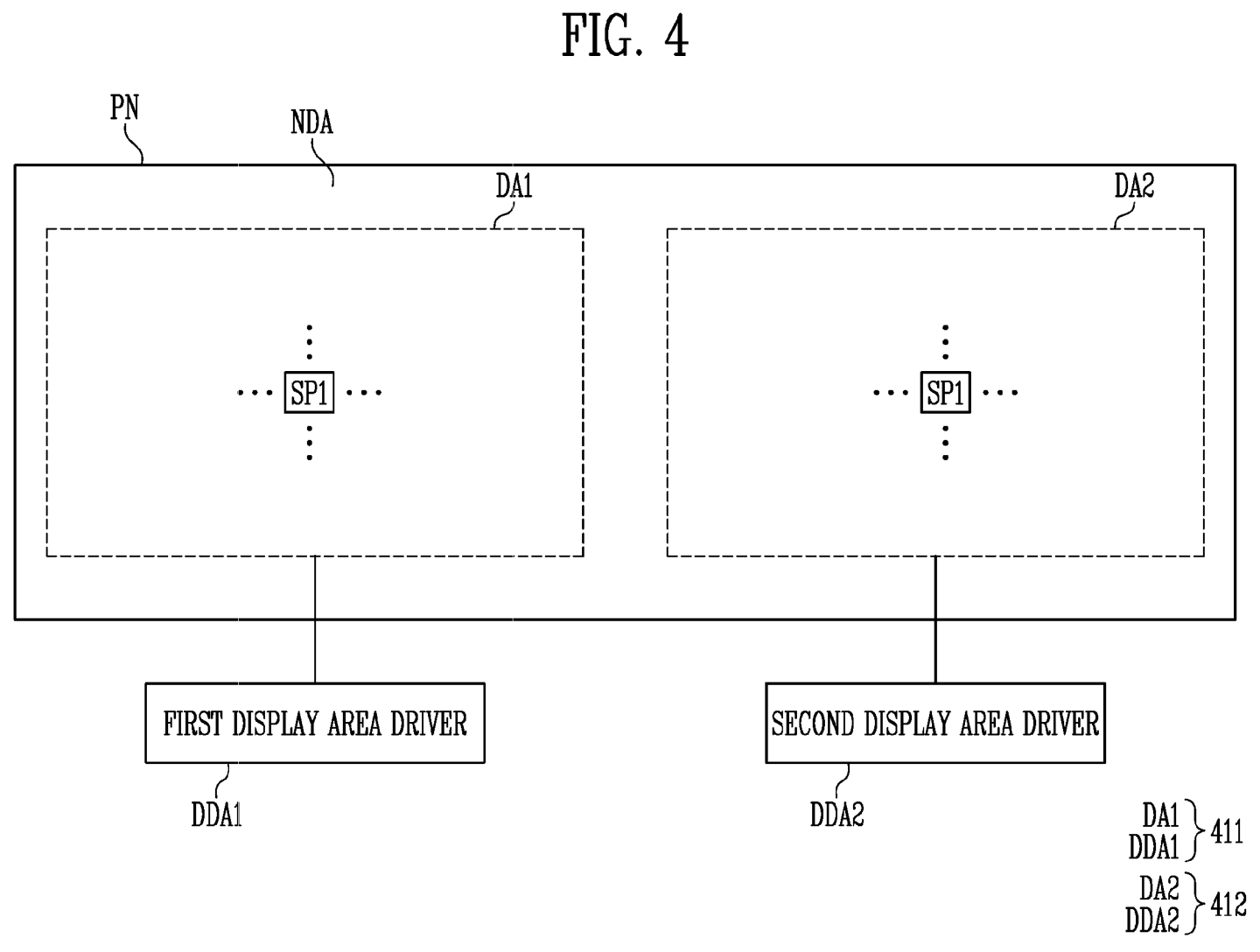

FIG. 4 is a schematic diagram illustrating an example of a first display unit 411 and a second display unit 412 of the vehicle control system 1000 shown in FIG. 2.

Referring to FIGS. 2 and 4, the vehicle control system 1000 may include a panel PN on which an image is displayed. The panel PN may include a first display area DA1 in which an image is displayed, a second display area DA2 in which the image is displayed, and a non-display area NDA adjacent to the first display area DA1 and the second display area DA2. For example, the first display area DA1 and the second display area DA2 may include first sub-pixels SP1.

In an embodiment, the first display unit 411 and the second display unit 412 may share the non-display area NDA. However, embodiments are not limited thereto. For example, the panel PN may include a first non-display area adjacent to the first display area DA1 and a second non-display area adjacent to the second display area DA2.

In an embodiment, the first display area DA1 and the second display area DA2 may share a window layer disposed above the panel PN. In an embodiment, the first display area DA1 and the second display area DA2 may have different display area drivers DDA1 and DDA2 connected to the first sub-pixels SP1 thereof.

The vehicle control system 1000 may include a first display area driver DDA1 which drives first sub-pixels SP1 of the first display area DA1 and a second display area driver DDA2 which drives first sub-pixels SP1 of the second display area DA2.

The first display unit 411 may include the first display area DA1 and the first display area driver DDA1. The second display unit 412 may include the second display area DA2 and the second display area driver DDA2.

As described above, the vehicle control system 1000 may divisionally drive the display unit 410. Accordingly, although a display unit of the vehicle control system 1000 is damaged, an image may be displayed through another display unit which is not damaged.

In an embodiment, the vehicle control system 1000 may include two display units 411 and 412. However, embodiments are not limited to the number of display units included in the display unit 410.

Figure 5:
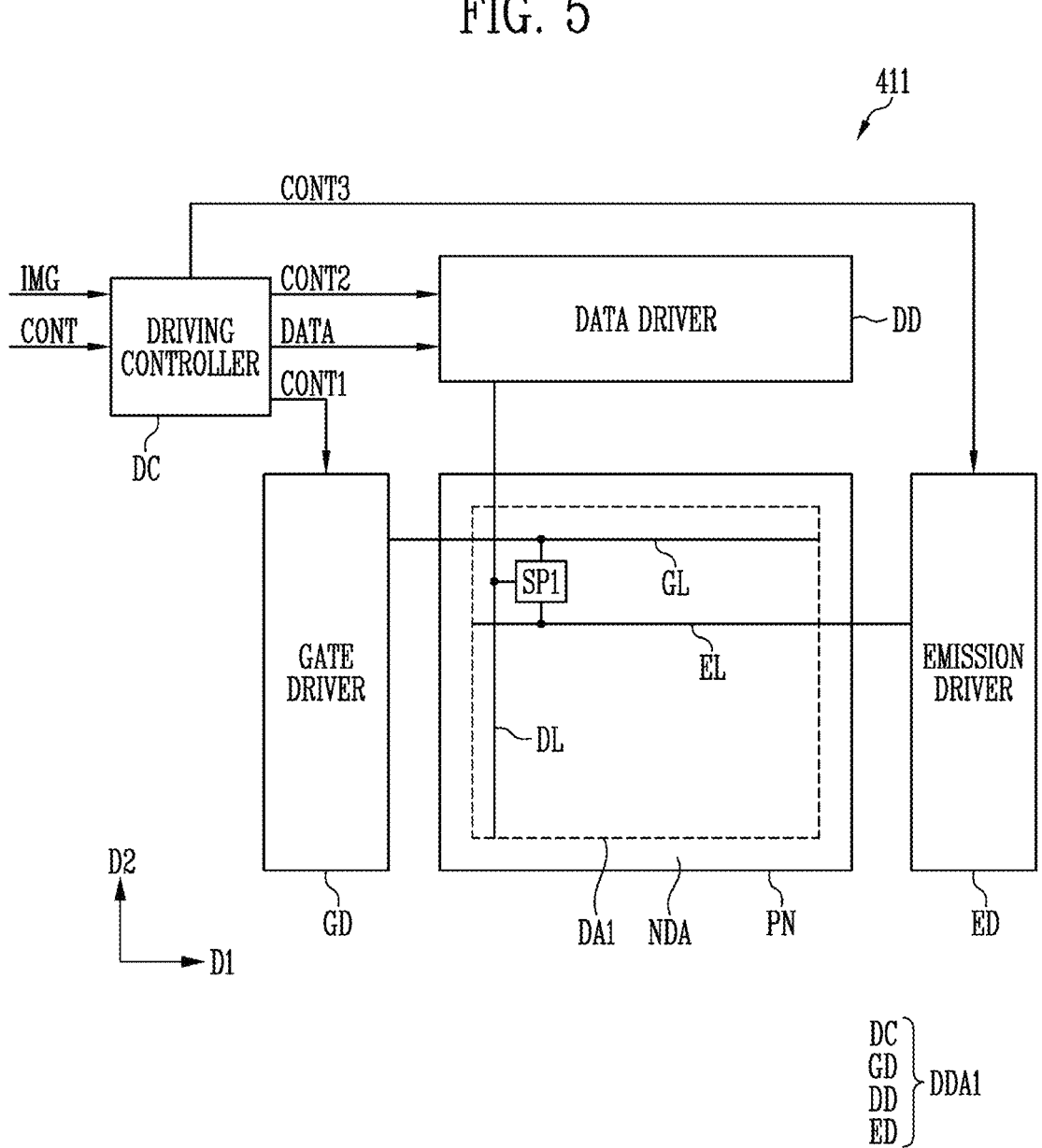
FIG. 5 is a schematic block diagram illustrating an example of the first display unit shown in FIG. 4.

FIG. 5 is a schematic block diagram illustrating an example of the first display unit 411 shown in FIG. 4.

For convenience of description, the second display area DA2 and the second display area driver DDA2 are omitted in FIG. 5. However, the second display area driver DDA2 may be substantially identical to the first display area driver DDA1, except that the second display area driver DDA2 drives the first sub-pixels SP1 of the second display area DA2, and therefore, the redundant descriptions will be omitted for descriptive convenience.

Referring to FIGS. 2, 4, and 5, the first display area driver DDA1 may include a driving controller DC, a gate driver GD, a data driver DD, and an emission driver ED. In an embodiment, the driving controller DC and the data driver DD may be integrated into a single chip.

In an embodiment, the gate driver GD and the emission driver ED may be mounted in the non-display area NDA.

The panel PN may include gate lines GL, data lines DL, emission lines EL, and first sub-pixels SP1 electrically connected to the gate lines GL, the data lines DL, and the emission lines EL. The gate lines GL and the emission lines EL may extend in a first direction D1, and the data lines DL may extend in a second direction D2 intersecting the first direction D1.

The driving controller DC may receive input image data IMG and an input control signal CONT from a main processor such as a graphic processing unit (GPU) or the like. For example, the main processor may be included in the main controller 610. For example, the input image data IMG may include red image data, green image data, and blue image data. In an embodiment, the input image data IMG may further include white image data. In another example, the input image data IMG may include magenta image data, yell image data, and cyan image data. The input control signal CONT may include a master clock signal and a data enable signal. The input control signal CONT may further include a vertical synchronization signal and a horizontal synchronization signal.

The driving controller DC may generate a first control signal CONT1, a second control signal CONT2, a third control signal CONT3, and a data signal DATA, based on the input image data IMG and the input control signal CONT.

The driving controller DC may generate the first control signal CONT1 for controlling an operation of the gate driver GD, based on the input control signal CONT, and may output the first control signal CONT1 to the gate driver GD. The first control signal CONT1 may include a vertical start signal and a gate clock signal.

The driving controller DC may generate the second control signal CONT2 for controlling an operation of the data driver DD, based on the input control signal CONT, and output the second control signal CONT2 to the data driver DD. The second control signal CONT2 may include a horizontal start signal and a load signal.

The driving controller DC may generate the data signal DATA by receiving the input image data IMG and the input control signal CONT. The driving controller DC may output the data signal DATA to the data driver DD.

The driving controller DC may generate the third control signal CONT3 for controlling an operation of the emission driver ED, based on the input control signal CONT, and may output the third control signal CONT3 to the emission driver ED. The third control signal CONT3 may include a vertical start signal and an emission clock signal.

The gate driver GD may generate gate signals for driving the gate lines GL in response to the first control signal CONT1 input from the driving controller DC. The gate driver GD may output the gate signals to the gate lines GL. For example, the gate driver GD may sequentially output the gate signals to the gate lines GL.

The data driver DD may receive the second control signal CONT2 and the data signal DATA from the driving controller DC. The data driver DD may generate data voltages obtained by converting the data signal DATA into a voltage in an analog form. The data driver DD may output the data voltages to the data lines DL.

The emission driver ED may generate emission signals for driving the emission lines EL in response to the third control signal CONT3 input from the driving controller DC. The emission driver ED may output the emission signals to the emission lines EL. For example, the emission driver ED may sequentially output the emission signals to the emission lines EL.

Figure 6:
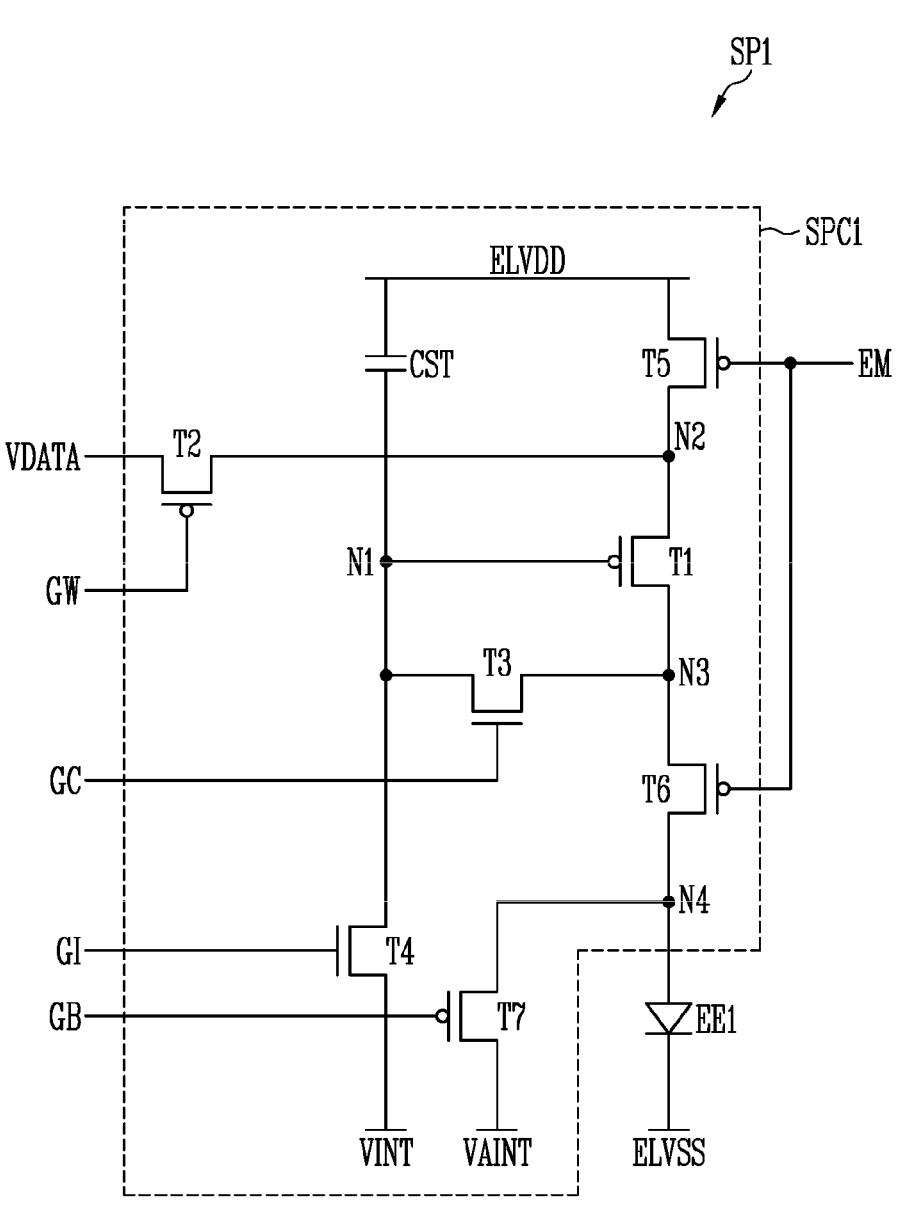
FIG. 6 is a schematic diagram of an equivalent circuit of an example of a first sub-pixel shown in FIG. 4.

FIG. 6 is a schematic diagram of an equivalent circuit of an example of the first sub-pixel SP1 shown in FIG. 4.

Referring to FIG. 6, the first sub-pixel SP1 may include a first pixel driving circuit SPC1 and a first light emitting element EE1.

For example, the first pixel driving circuit SPC1 may include: a first transistor T1 (e.g., a driving transistor) including a control electrode connected to a first node N1, a first electrode connected to a second node N2, and a second electrode connected to a third node N3; a second transistor T2 including a control electrode receiving a write gate signal GW, a first electrode receiving a data voltage VDATA, and a second electrode connected to the second node N2; a third transistor T3 including a control electrode receiving a compensation gate signal GC, a first electrode connected to the third node N3, and a second electrode connected to the first node N1; a fourth transistor T4 including a control electrode receiving an initialization gate signal G1, a first electrode receiving a first initialization voltage VINT, and a second electrode connected to the first node N1; a fifth transistor T5 including a control electrode receiving an emission signal EM, a first electrode receiving a first power voltage ELVDD (e.g., a high power voltage), and a second electrode connected to the second node N2; a sixth transistor T6 including a control electrode receiving the emission signal EM, a first electrode connected to the third node N3, and a second electrode connected to a fourth node N4; a seventh transistor T7 including a control electrode receiving a bias gate signal GB, a first electrode receiving a second initialization voltage VAINT, and a second electrode connected to the fourth node N4; and a storage capacitor CST including a first electrode receiving the first power voltage ELVDD and a second electrode connected to the first node N1. The first light emitting element EE1 may include a first electrode (e.g., an anode electrode) connected to the fourth node N4 and a second electrode receiving a second power voltage ELVSS (e.g., a low power voltage). However, embodiments are not limited thereto. For example, the first pixel driving circuit SPC1 may have a structure a 3T-1C structure formed with three transistors and a single capacitor, a 5T-2C structure formed with five transistors and two capacitors, a 7T-1C structure formed with seven transistors and a single capacitor, a 9T-1C structure formed with nine transistors and a single capacitor, or the like.

The first, second, fifth, sixth, and seventh transistors T1, T2, T5, T6, and T7 may be implemented as a P-channel metal oxide semiconductor (PMOS) transistor. A low voltage level may be an activation level (or a gate-on voltage), and a high voltage level may be an inactivation level (or a gate-off voltage). For example, in case that a signal applied to a control electrode of the PMOS transistor has the low voltage level, the PMOS transistor may be turned on. For example, in case that a signal applied to the control electrode of the PMOS transistor has the high voltage level, the PMOS transistor may be turned off.

The third and fourth transistors T3 and T4 may be implemented as an n-channel metal oxide semiconductor (NMOS) transistor. A low voltage level may be the inactivation level, and a high voltage level may be the activation level. For example, in case that a signal applied to a control electrode of the NMOS transistor has the low voltage level, the NMOS transistor may be turned off. For example, in case that a signal applied to the control electrode of the NMOS transistor has the high voltage level, the NMOS transistor may be turned on. For example, the activation level and the inactivation level may be determined according to a kind of transistor.

However, embodiments are not limited thereto. For example, the first, second, and fifth to seventh transistors T1, T2, T5, T6, and T7 may be implemented as an NMOS transistor. For example, the third and fourth transistors T3 and T4 may be implemented as PMOS transistors.

For example, during an initialization period, the initialization gate signal G1 may have the activation level, and the fourth transistor T4 may be turned on. Accordingly, the first initialization voltage VINT may be applied to the first node N1 such that a gate initialization operation may be performed. For example, the control electrode of the first transistor T1 may be initialized such that the storage capacitor CST may be initialized.

For example, during a data writing period, the write gate signal GW and the compensation gate signal GC may have the activation level, and the second transistor T2 and the third transistor T3 may be turned on. Accordingly, the data voltage VDATA may be written into the storage capacitor CST (e.g., a data writing operation).

For example, during an anode initialization period, the bias gate signal GB may have the activation level, and the seventh transistor T7 may be turned on. Accordingly, the second initialization voltage VAINT may be applied to the first electrode (e.g., the anode electrode) of the first light emitting element EE1 such that an anode initialization operation may be performed.

For example, during a light emission period, the emission signal EM may have the activation level, and the fifth transistor T5 and the sixth transistor T6 may be turned on. Accordingly, the first power voltage ELVDD may be applied to the first transistor T1, so that a driving current may be generated, and the driving current may be applied to the first light emitting element EE1 such that light emission operation may be performed. For example, the first light emitting element EE1 may emit light with a luminance corresponding to the driving current.

Figure 7:
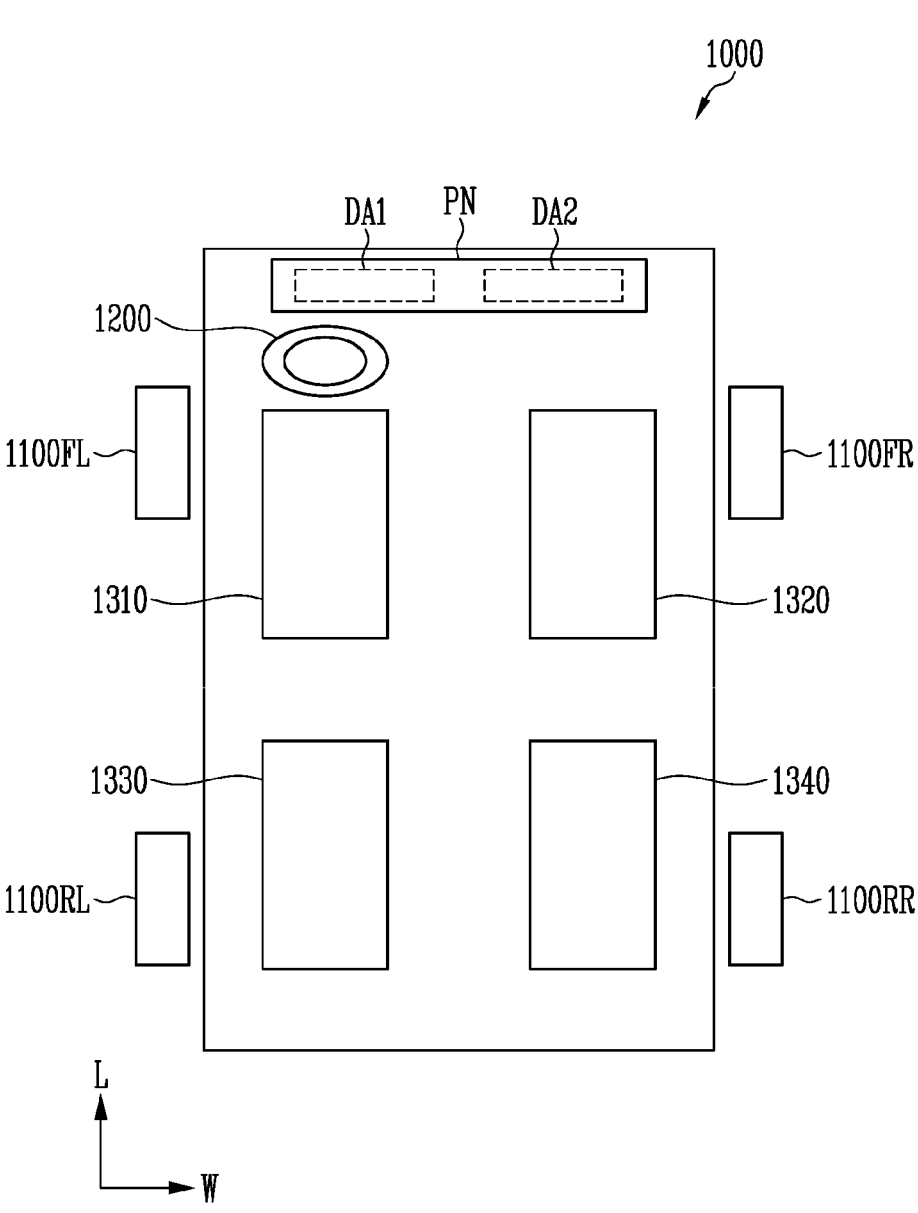
FIGS. 7 to 9 are schematic diagrams illustrating an example of an arrangement of a first display area and a second display area according to the vehicle control system shown in FIG. 2.
Figure 8:
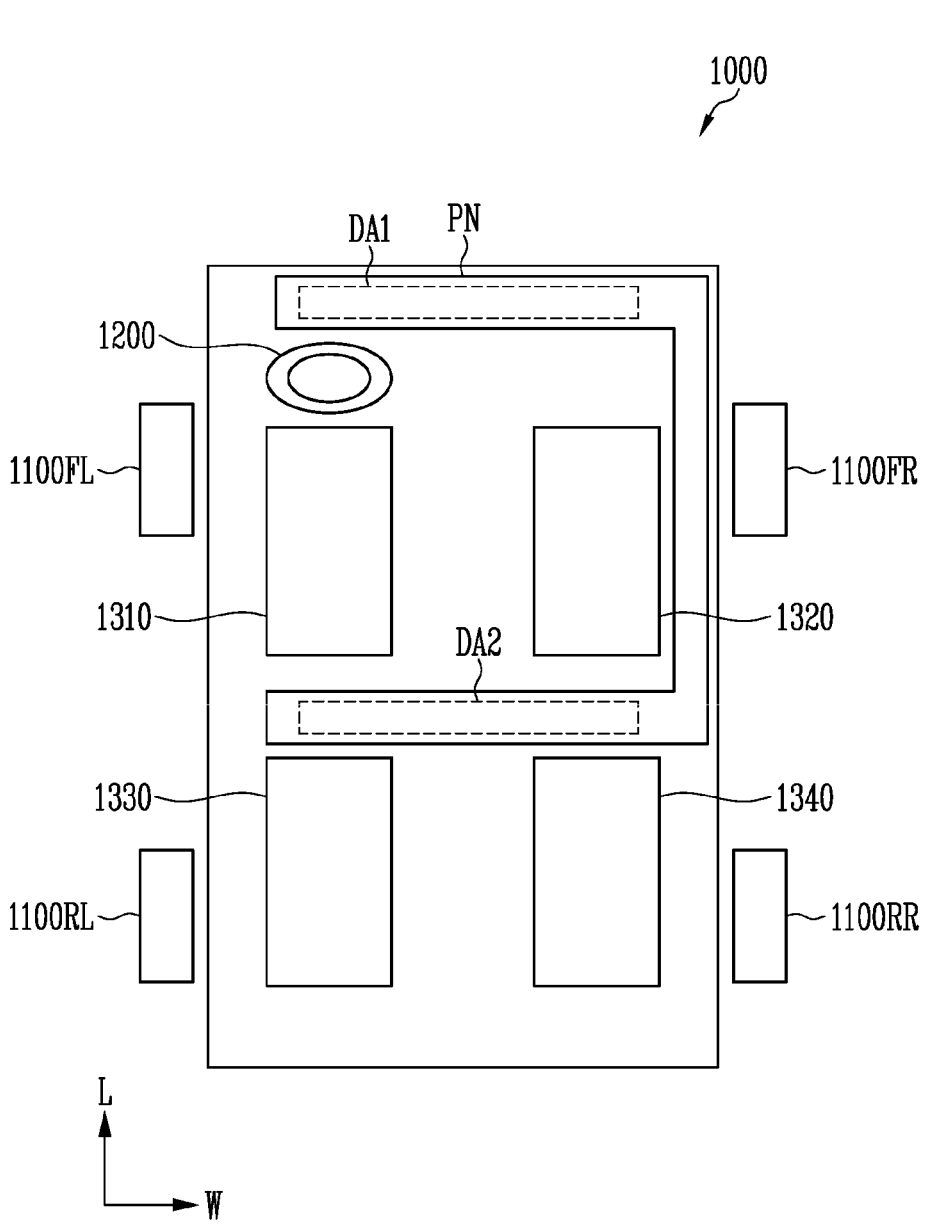
Figure 9:
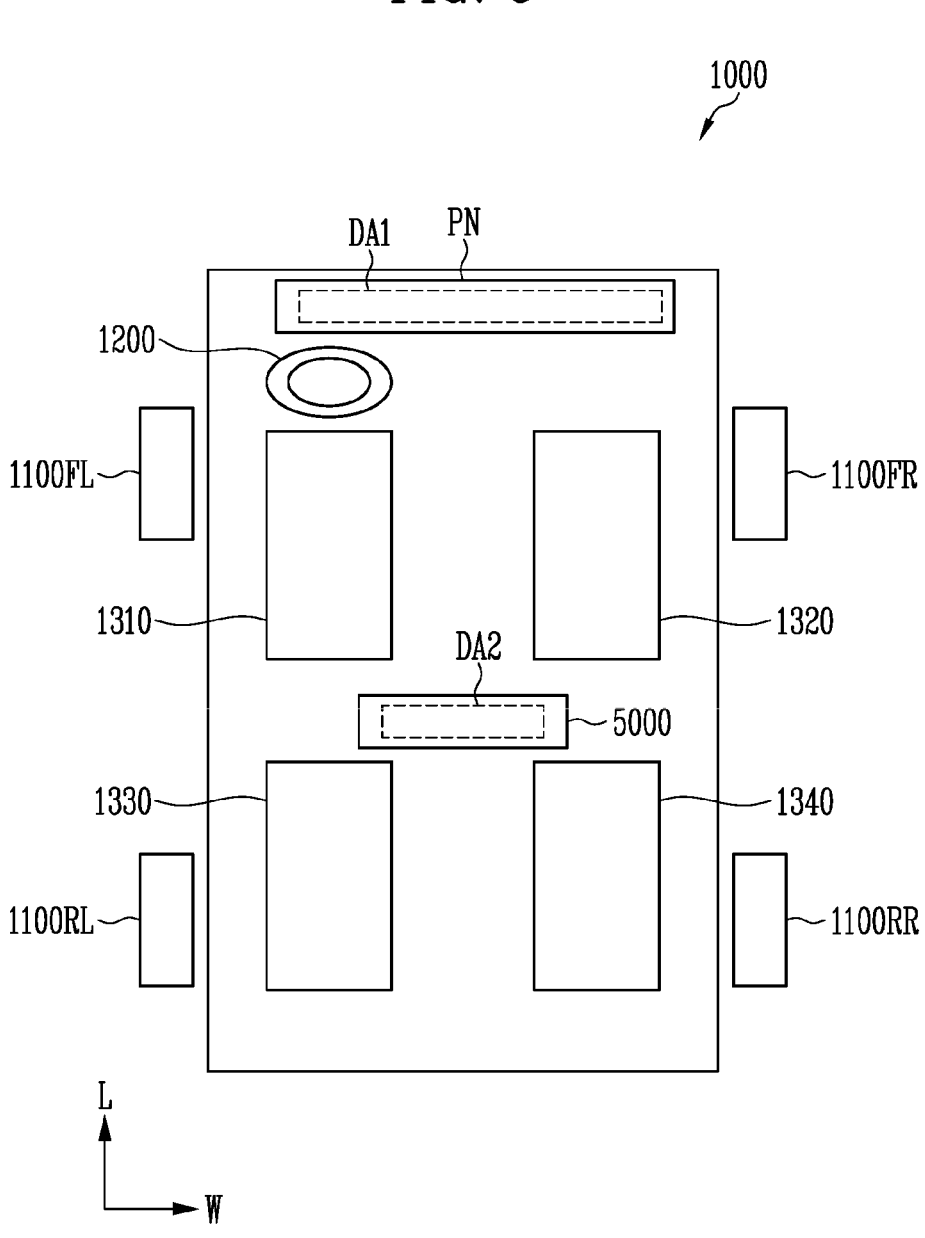

FIGS. 7, 8, and 9 are schematic diagrams illustrating an example of an arrangement of the first display area DA1 and the second display area DA2 according to the vehicle control system 1000 shown in FIG. 2.

In FIGS. 7, 8, and 9, a Left Hand Drive (LHD) vehicle is an example. However, embodiments are not limited thereto.

Referring to FIG. 7, the first display area DA1 may be closer to a driver seat 1310 of the vehicle than the second display area DA2. The second display area DA2 may be closer to a passenger seat 1320 of the vehicle than the first display area DA1.

For example, the driver seat 1310 of the vehicle may be a seat at which a steering input part 1200 is disposed. For example, the passenger seat 1320 of the vehicle may be a seat disposed in an overall width direction W of the driver seat 1310.

Referring to FIG. 8, the first display area DA1 may be disposed in a front direction L of front seats (e.g., a driver seat and a passenger seat) 1310 and 1320 of the vehicle, and the second display area DA2 may be disposed in the opposite direction of the front direction L of the front seats (e.g., a driver seats and a passenger seat) 1310 and 1320 of the vehicle. For example, the first display area DA1 may be a display area for a driver sitting on the driver seat 1310 and a first passenger sitting on the passenger seat 1320, and the second display area DA2 may be a display area for a second passenger sitting on a first back seat 1330 and a third passenger sitting on a second back seat 1340.

Referring to FIG. 9, the first display area DA1 may be integral with the vehicle, and the second display area DA2 may be formed in an electronic device 5000, which is separated from the vehicle. For example, the electronic device 5000 may be a digital TV, a 3D TV, a mobile phone, a smart phone, a tablet computer, a notebook computer, a PDA, a PMP, or the like.

An emergency switch and the like, which will be described below, may be formed in the second display area DA2. Therefore, in an emergency situation of the vehicle, an emergency situation of the driver, and an emergency situation of the driver and the first passenger, at least one of the first to third passengers may partially have the right of control over the vehicle.

Figure 10:
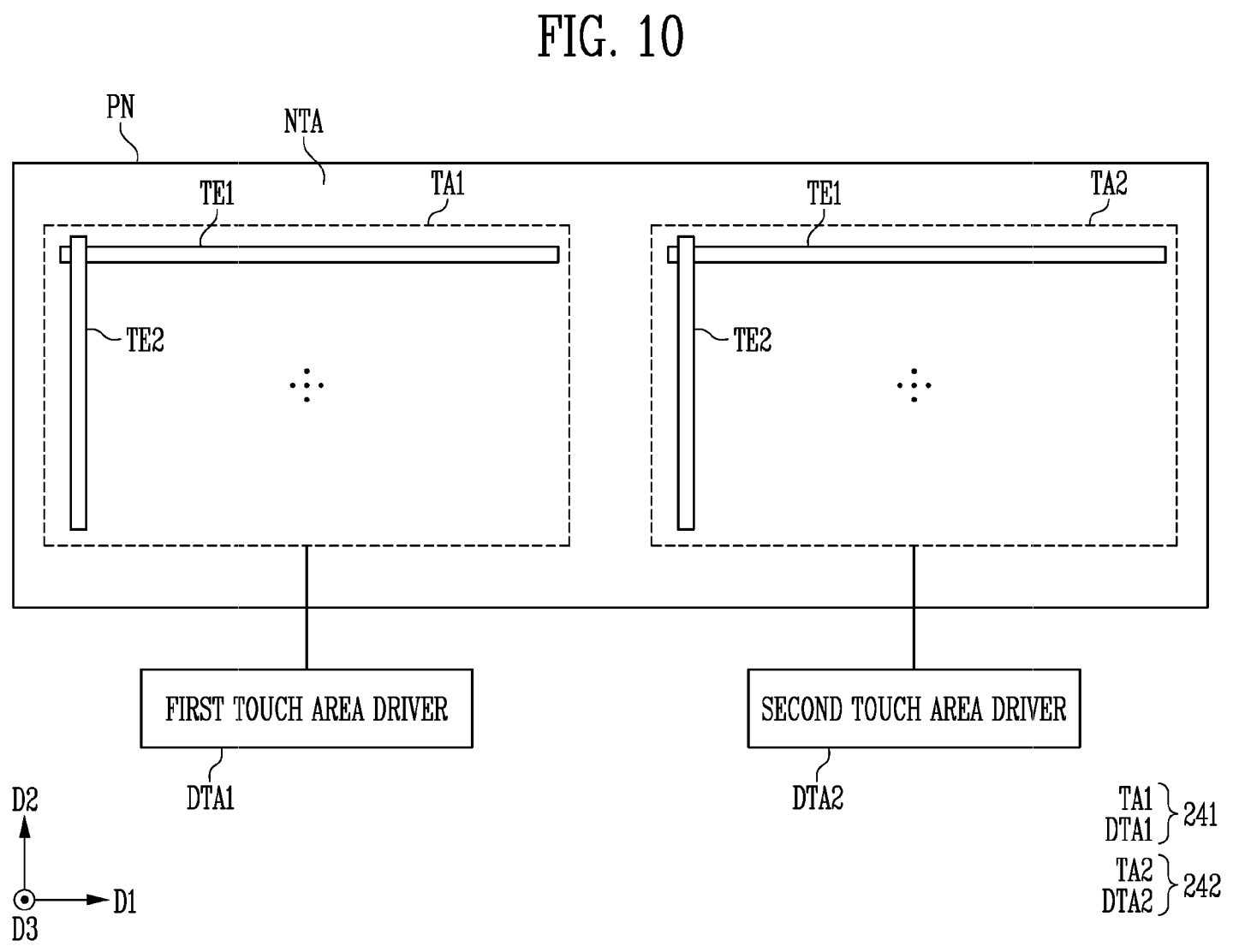

FIG. 10 is a schematic diagram illustrating an example of the first touch unit 241 and the second touch unit 242 of the vehicle control system 1000 shown in FIG. 2.

Referring to FIGS. 2, 3, and 4 and 10, the vehicle control system 1000 may include a panel PN to which a touch of a user is input. The panel PN may include a first touch area TA1 which has at least a portion overlapping the first display area DA1 and receives a touch of the user, a second touch area TA2 which has at least a portion overlapping the second display area DA2 and receives the touch of the user, and a non-touch area NTA adjacent to the first touch area TA1 and the second touch area TA2. For example, the first touch area TA1 and the second touch area TA2 may include touch electrodes TE1 and TE2.

In an embodiment, the first touch unit 241 and the second touch unit 242 may share the non-touch area NTA. However, embodiments are not limited thereto. For example, the panel PN may include a first non-touch area adjacent to the first touch area TA1 and a second non-touch area adjacent to the second touch area TA2.

In an embodiment, the first touch area TA1 and the second touch area TA2 may share a window layer disposed above the panel PN. In an embodiment, the first touch area TA1 and the second touch area TA2 may have different touch area drivers DTA1 and DTA2 connected to the touch electrodes TE1 and TE2 thereof.

The vehicle control system 1000 may include a first touch area driver DTA1 which drives touch electrodes TE1 and TE2 of the first touch area TA1 and a second touch area driver DTA2 which drives touch electrodes TE1 and TE2 of the second touch area TA2.

The first touch unit 241 may include the first touch area TA1 and the first touch area driver DTA1. The second touch unit 242 may include the second touch area TA2 and the second touch area driver DTA2.

As described above, the vehicle control system 1000 may divisionally drive the touch unit 241 and 242. Accordingly, although a touch unit of the vehicle control system 1000 is damaged, the vehicle may be controlled through another touch unit which is not damaged.

In an embodiment, the vehicle control system 1000 may include two touch units 241 and 242. However, embodiments are not limited to the number of touch units 241 and 242.

In the disclosure, the number of touch units 241 and 242 and the number of display units 411 and 412 are not necessarily the same as each other. In an embodiment, the number of touch units 241 and 242 may be different from the number of display units 411 and 412.

Figure 11:
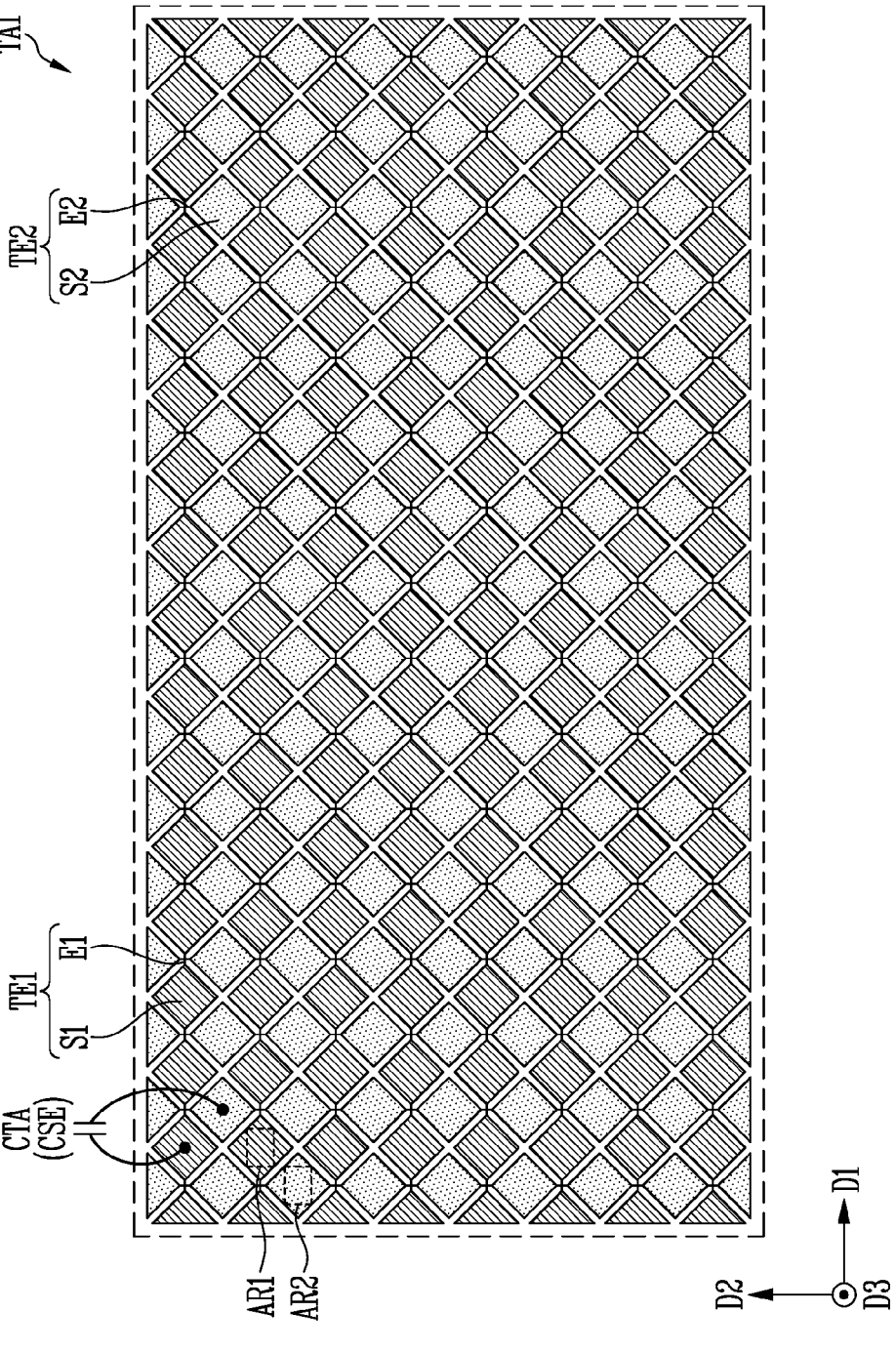
FIG. 11 is a schematic diagram illustrating an example of a first touch area shown in FIG. 10.

FIG. 11 is a schematic diagram illustrating an example of the first touch area TA1 shown in FIG. 10.

The second touch area TA2 may be substantially identical to the first touch area TA1, and therefore, the redundant descriptions will be omitted for descriptive convenience.

Referring to FIGS. 2, 10, and 11, a first touch electrode TE1 may extend in a first direction D1. For example, each of first touch electrodes TE1 may be disposed in the touch area TA1 or TA2 and may extend in a row direction (or first direction D1).

A second touch electrode TE2 may extend along a second direction D2 intersecting the first direction D1. For example, each of second touch electrodes TE2 may be disposed in the touch area TA1 or TA2 and may extend in a column direction (or first direction D1).

The touch area TA1 or TA2 may be driven in a mutual capacitance method. In the mutual capacitance method, any one of the first touch electrode TE1 and the second touch electrode TE2 may function as a touch driving electrode, and the other of the first touch electrode TE1 and the second touch electrode TE2 may function as a touch sensing electrode. A touch driving signal may be input to the touch driving electrode, and a touch sensing signal may be output from the touch sensing electrode. For example, the touch area driver DTA1 or DTA2 may output a touch driving signal and receive a touch sensing signal. In an embodiment, the first touch electrode TE1 may receive a touch driving signal for touch driving, and the second touch electrode TE2 may output a touch sensing signal corresponding to the touch driving signal. In an embodiment, the second touch electrode TE2 may receive a touch driving signal, and the first touch electrode TE1 may output a touch sensing signal corresponding to the touch driving signal. In the following, for convenience of description, a case where the first touch electrode TE1 receives a touch driving signal and the second electrode TE2 outputs a touch sensing signal is described as an example. However, embodiments are not limited thereto.

In an embodiment, the touch area TA1 or TA2 may be driven in the mutual capacitance method. However, embodiments are not limited thereto. For example, the touch area TA1 or TA2 may be driven in a self-dot method.

A capacitor CSE may be formed between the first touch electrode TE1 and the second touch electrode TE2. The first touch electrode TE1 and the second touch electrode TE2 may be disposed in an overlapping area, and may overlap each other in a vertical direction (e.g., a third direction D3 intersecting the first direction D1 and the second direction D2). In the overlapping area, the first touch electrode TE may function as an electrode of the capacitor CSE, and the second touch electrode TE2 may function as the other electrode. In the overlapping area, the capacitor CSE may be formed between the first touch electrode TE1 and the second touch electrode TE2. In case that an object (e.g., a finger of a person, or the like) approaches toward the touch area TA1 or TA2, a capacitance between the first touch electrode TE1 and the second touch electrode TE2 may be changed. The touch area driver DTA1 or DTA2 may detect whether a touch is input and/or a coordinate of the touch, based on the changed capacitance.

The first touch electrode TE1 may include a first sensing cell S1 and a first connection electrode E1. The second touch electrode TE2 may include a second sensing cell S2 and a second connection electrode E2.

The first touch electrode TE1 may extend along the row direction (e.g., the first direction D1). A first touch electrode TE1 disposed on each row may include first sensing cells S1 and a first connection electrode E1 that connects the first sensing cells S1 to each other.

The second touch electrode TE2 may extend along the column direction (e.g., the second direction D2). A second touch electrode TE2 disposed on each column may include second sensing cells S2 and a second connection electrode E2 that connects the second sensing cells S2 to each other.

In an embodiment, the first touch electrode TE1 may be disposed in the same layer as the second touch electrode TE2. The first connection electrode E1 and the second connection electrode E2 may be formed in a bridge-shaped connection pattern layer. In an embodiment, the first touch electrode TE1 may be disposed in a layer different from a layer in which the second touch electrode TE2 is disposed.

The first connection electrode E1 and the second connection electrode E2 may be positioned to overlap each other in the vertical direction (e.g., the third direction D3). The first connection electrode E1 and the second connection electrode E2 may be insulated from each other by an insulating layer.

A capacitor CSE may be formed between the first touch electrode TE1 and the second touch electrode TE2. For example, the first touch electrode TE1 may function as an electrode of the capacitor CSE, and the second touch electrode TE2 adjacent to the first touch electrode TE2 may function as the other electrode of the capacitor CSE. The capacitor CSE may be formed in an adjacent area CTA between the first touch electrode TE1 and the second touch electrode TE2. Air (e.g., the atmosphere) between the first touch electrode TE1 and the second touch electrode TE2 may function as an insulating material of the capacitor CSE. Accordingly, whether a touch is input and/or a coordinate of the touch may be detected in the mutual capacitance method.

Figure 12:
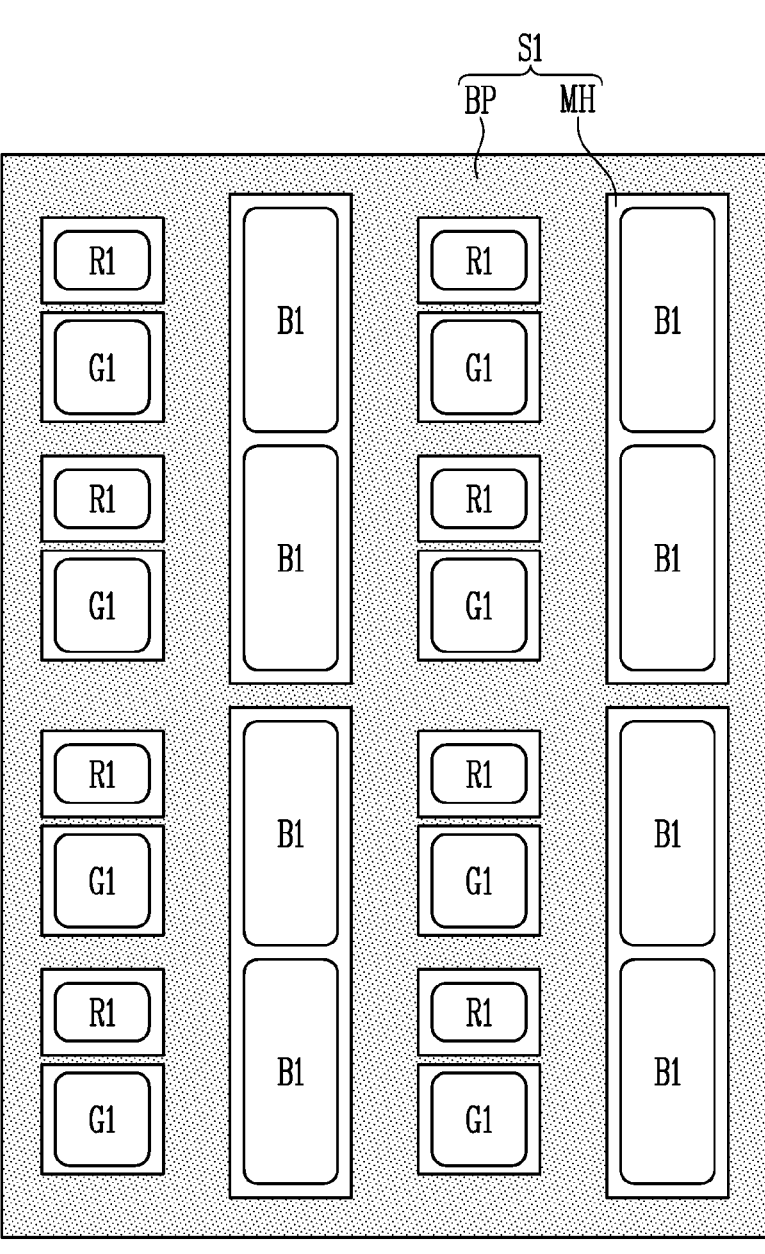
FIG. 12 is an enlarged schematic view of a first area shown in FIG. 11.

FIG. 12 is an enlarged schematic view of a first area AR1 shown in FIG. 11.

Referring to FIGS. 6 and 12, first sub-pixels SP1 may include at least one first light emitting element R1 emitting light of a first color, a first light emitting element G1 emitting light of a second color, and a first light emitting element B1 emitting light of a third color. For example, the first color may be red, the second color may be green, and the third color may be blue.

The first sub-pixels SP1 may be arranged in various manners or patterns. For example, as shown in FIG. 12, first light emitting elements R1 emitting light of the first color and first light emitting elements G1 emitting light of the second color may be alternately arranged along a column in the color direction (e.g., the second direction D2), and first light emitting elements B1 emitting light of the third color may be arranged along a column adjacent to the column.

An area of the first light emitting element B1 emitting light of the third color may be different from an area of the first light emitting element R1 emitting light of the first color and an area of the first light emitting element G1 emitting light of the second color. For example, the area of the first light emitting element B1 emitting light of the third color may be greater than the area of the first light emitting element R1 emitting light of the first color and the area of the first light emitting element G1 emitting light of the second color. However, embodiments are not limited to sizes of the first light emitting elements R1, G1, and B1.

The shape of the first light emitting elements R1, G1, and B1 may be variously designed or formed. For example, referring to FIG. 12, it is illustrated that the shape of the first light emitting elements R1, G1, and B1 is a quadrangular shape having round corners. In another example, the first light emitting elements R1, G1, and B1 may have a shape such as a circular shape, another polygonal shape, or a polygonal shape having round corners.

The first sensing cell S1 may include a mesh hole MH and a body part BP.

The mesh hole MH may overlap the first light emitting elements R1, G1, and B1 in a thickness direction (e.g., the third direction D3). The first light emitting elements R1, G1, and B1 may be positioned in an area corresponding to the mesh hole MH. An area of the mesh hole MH may be greater than the areas of the first light emitting elements R1, G1, and B1.

In an embodiment, a mesh hole (e.g., single mesh hole) MH may overlap two first light emitting elements B1 emitting light of the third color. However, embodiments are not limited to the arrangement of the first light emitting elements R1, G1, and B1.

The body part BP may be an area adjacent to the mesh hole MH. For example, the body part BP may be an area surrounding the mesh hole MH.

Through the above-described structure, light emitted from the first light emitting elements R1, G1, and B1 of the first sub-pixel SP1 may be effectively transmitted through the first touch electrode TE1.

Figure 13:
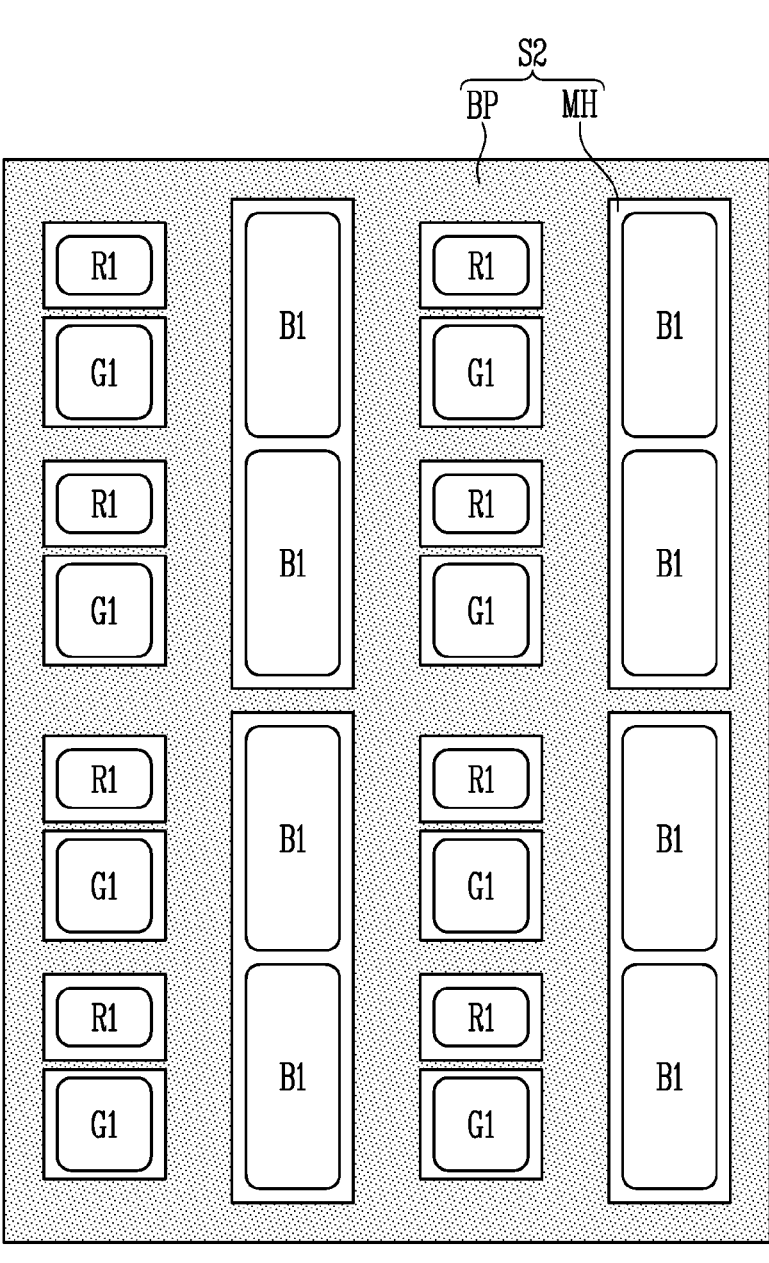
FIG. 13 is an enlarged schematic view of a second area shown in FIG. 11.

FIG. 13 is an enlarged schematic view of a second area AR2 shown in FIG. 11.

Referring to FIGS. 12 and 13, the descriptions of the first sensing cell S1 may be generally applied as descriptions of the second sensing cell S2. The second sensing cell S2 may include a body part BP and a mesh hole MH. Descriptions of the other components are substantially the same as described in FIG. 12.

Figure 14:
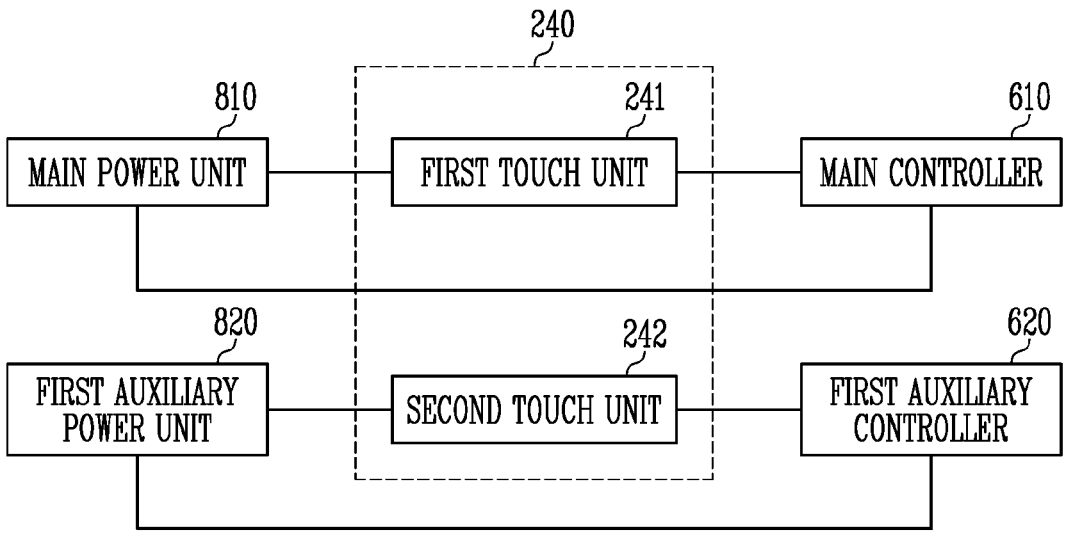
FIG. 14 is a schematic block diagram illustrating an example of operations of a main power unit and a first auxiliary power unit of a vehicle control system in accordance with embodiments.
Figure 15:
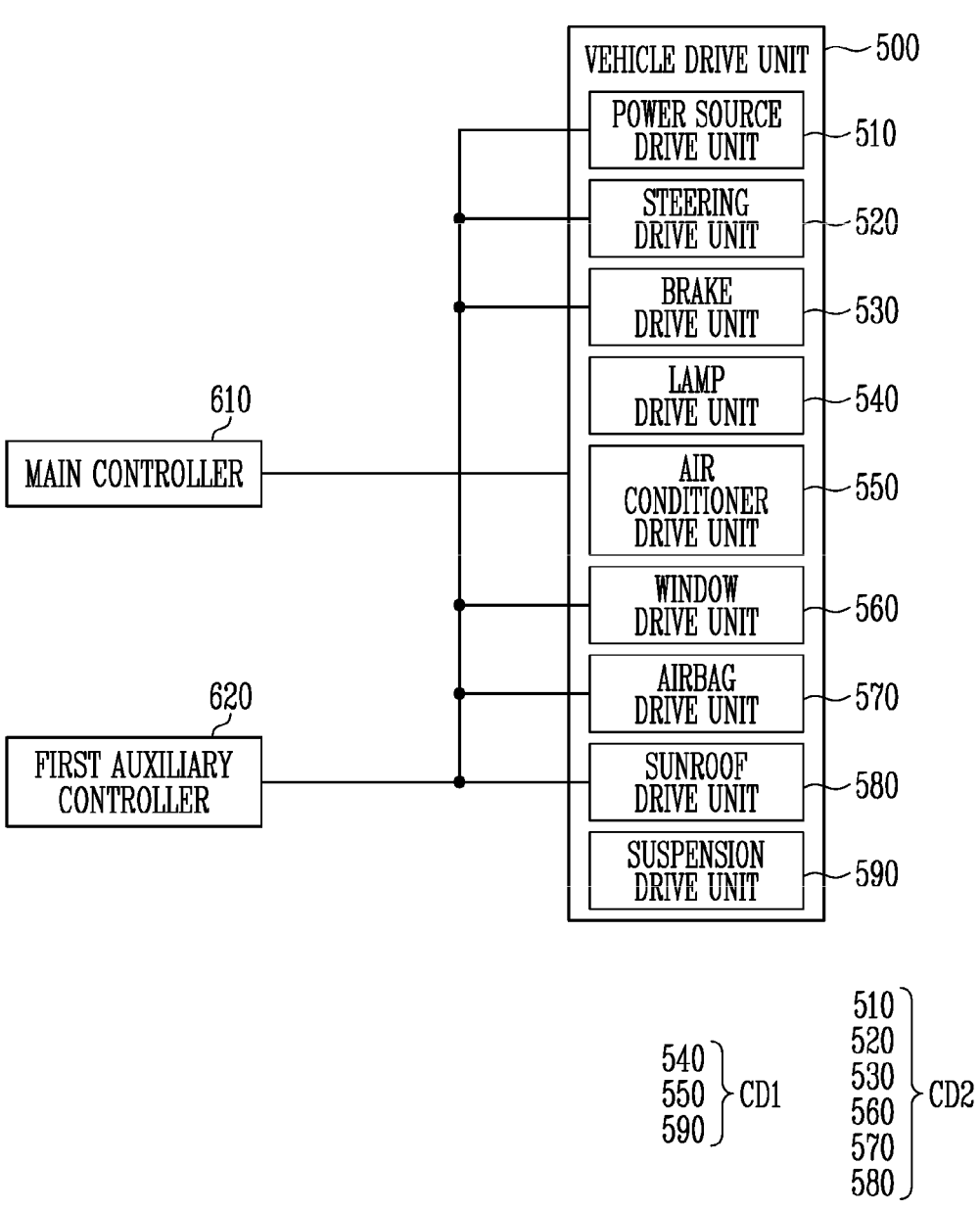
FIG. 15 is a schematic block diagram illustrating an example of operations of a main controller and a first auxiliary controller of the vehicle control system shown in FIG. 14.

FIG. 14 is a schematic block diagram illustrating an example of operations of a main power unit 810 and a first auxiliary power unit 820 of a vehicle control system in accordance with embodiments. FIG. 15 is a schematic block diagram illustrating an example of operations of a main controller 610 and a first auxiliary controller 620 of the vehicle control system shown in FIG. 14.

The vehicle control system in accordance with an embodiment may be formed as the vehicle control system 1000 shown in FIG. 2, except for the first auxiliary controller 620. Therefore, components identical or similar to those described above are designated by like reference numerals, and the redundant descriptions will be omitted for descriptive convenience.

Referring to FIG. 14, in case that information is input through the second touch unit 242, the first auxiliary controller 620 may control an operation of the vehicle control system to correspond to the input information.

The first auxiliary power unit 820 may supply a first auxiliary power to the second touch unit 242 and the first auxiliary controller 620. For example, the vehicle control system may supply powers from different power units to the first touch unit 241 and the second touch unit 242, and supply the powers from the different power units to the main controller 610 and the first auxiliary controller 620. Accordingly, although the main power unit 810 or the first touch unit 241 is damaged, the second touch unit 242 and the first auxiliary controller 620 may be normally operated, and a user may control a vehicle through the second touch unit 242.

Referring to FIGS. 14 and 15, the vehicle drive unit 500 may include first vehicle drive units CD1 which drive first devices of a vehicle and second vehicle drive units CD2 which drive second devices, which are different from the first devices of the vehicle, and the first auxiliary controller 620 may control the second vehicle drive units CD2 in response to a touch of a user in the second touch unit 242.

The second devices may be devices for control in at least one of an emergency situation of the vehicle, an emergency situation of a driver, and an emergency situation of the driver and a first passenger. For example, the second devices may include at least one of a power source, a steering device, a brake device, a window device, an airbag device, and a sunroof device.

Accordingly, although the main power unit 810 or the first touch unit 241 is damaged, the second touch unit 242 and the first auxiliary controller 620 may be normally operated, and the user may partially have the right of control over the vehicle through the second touch unit 242.

Figure 16:
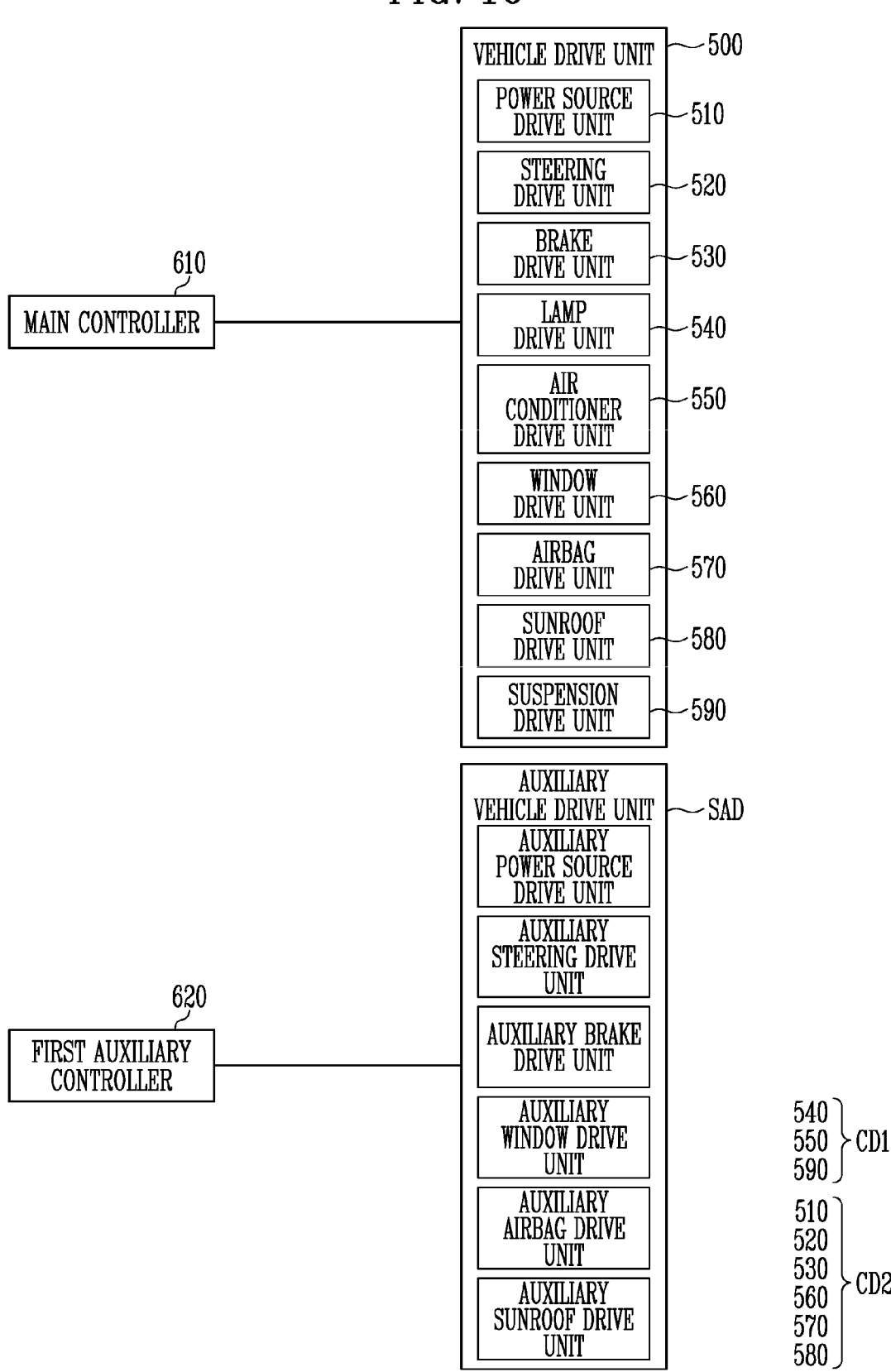
FIG. 16 is a schematic block diagram illustrating an example of operations of a main power unit and a first auxiliary power unit of a vehicle control system in accordance with embodiments.

FIG. 16 is a schematic block diagram illustrating an example of operations of a main controller 610 and a first auxiliary controller 620 of a vehicle control system in accordance with embodiments.

The vehicle control system in accordance with an embodiment may be formed as the vehicle control system shown in FIG. 14, except for the first auxiliary controller 620. Therefore, components identical or similar to those described above are designated by like reference numerals, and the redundant descriptions will be omitted for descriptive convenience.

Referring to FIGS. 14 and 16, the vehicle drive unit 500 may include first vehicle drive units CD1 which drive first devices of a vehicle and second vehicle drive units CD2 which drive second devices of the vehicle, which are different from the first devices, and the vehicle control system may further include an auxiliary vehicle drive unit SAD which drive the second devices and the first auxiliary controller 620 which controls the auxiliary vehicle drive unit SAD in response to a touch of a user in the second touch unit 242.

In an embodiment, the auxiliary vehicle drive unit SAD may include at least one of an auxiliary power source drive unit substantially identical to the power source drive unit 510, an auxiliary steering drive unit substantially identical to the steering drive unit 520, an auxiliary brake drive unit substantially identical to the brake drive unit 530, an auxiliary window drive unit substantially identical to the window drive unit 560, an auxiliary airbag drive unit substantially identical to the airbag drive unit 570, and an auxiliary sunroof drive unit substantially identical to the sunroof drive unit 580.

In an embodiment, the auxiliary vehicle drive unit SAD may be supplied with a first auxiliary power from the first auxiliary power unit 820. Thus, although the main power unit 810 is damaged, the auxiliary vehicle drive unit SAD may be normally operated, and the user may partially have the right of control over the vehicle through the second touch unit 242.

Figure 17:
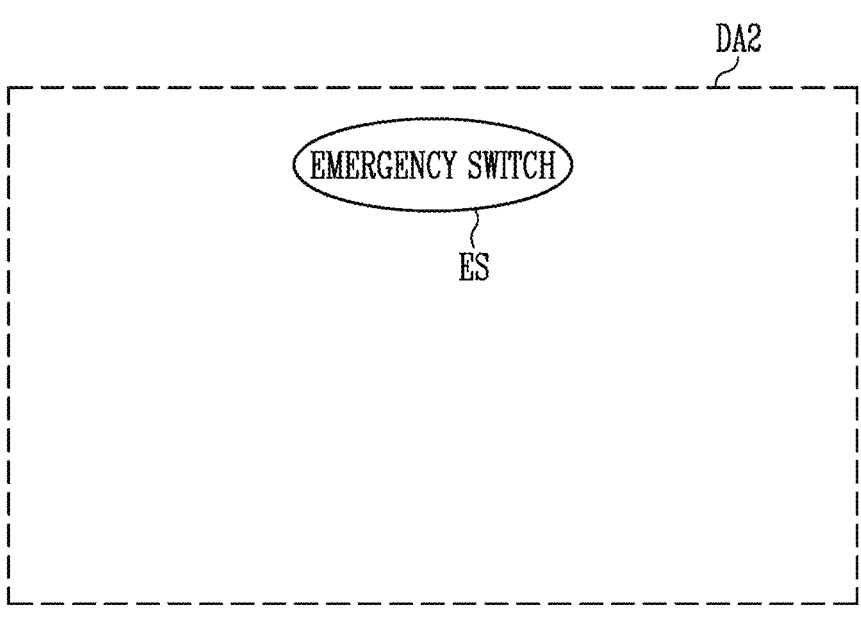
FIG. 17 is a schematic diagram illustrating a second display area of a vehicle control system in accordance with embodiments.
Figure 18:
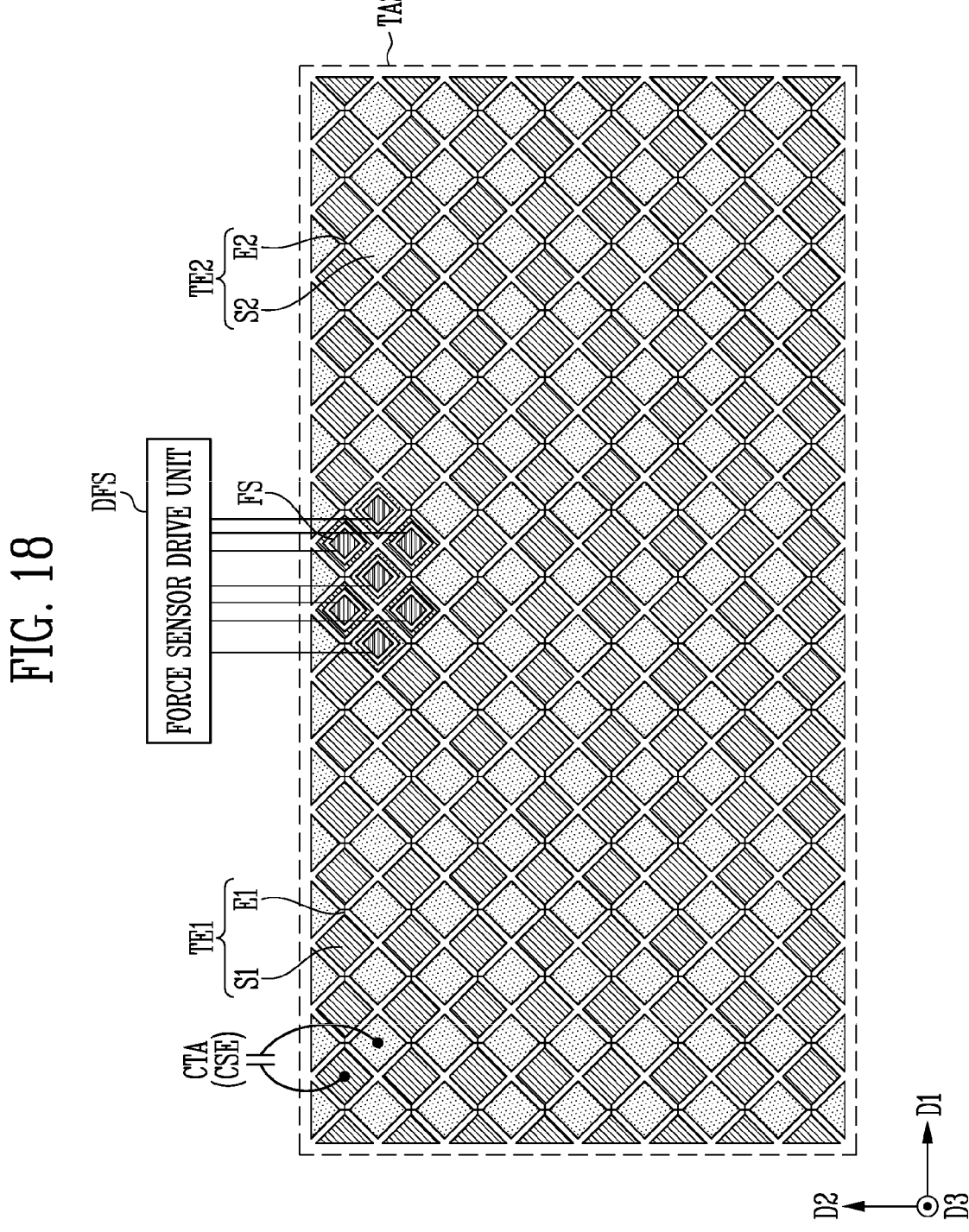
FIG. 18 is a schematic diagram illustrating a second touch area of the vehicle control system shown in FIG. 17.

FIG. 17 is a schematic diagram illustrating a second display area DA2 of a vehicle control system in accordance with embodiments. FIG. 18 is a schematic diagram illustrating a second touch area TA2 of the vehicle control system shown in FIG. 17.

The vehicle control system in accordance with an embodiment may be formed as the vehicle control system 1000 shown in FIG. 2, except for an emergency switch ES. Therefore, components identical or similar to those described above are designated by like reference numerals, and the redundant descriptions will be omitted for descriptive convenience.

Referring to FIGS. 4, 10, 17, and 18, the second display unit 412 may display the emergency switch ES in a portion of the second display area DA2 overlapping at least a portion of the second touch area TA2. In an embodiment, the second display unit 412 may display the emergency switch ES in the emergency mode which will be described below. For example, the emergency switch ES may be a switch for turning on an emergency light of the vehicle.

The second touch unit 242 may include a force sensor FS disposed in at least a portion of the second touch area TA2 and a force sensor driver DFS which drives the force sensor FS. For example, the force sensor FS may be a strain gauge. For example, the force sensor driver DFS may output a force sensor driving signal to the force sensor FS, and may detect whether a touch of a user is input from a change in the force sensor driving signal.

In an embodiment, the force sensor FS may be formed separately from touch electrodes TE1 and TE2. In an embodiment, at least one of the touch electrodes TE1 and TE2 may be formed as a dummy pattern layer, and the force sensor FS may be formed with the dummy pattern layer. The dummy pattern layer may be a portion which is cut from at least one of the touch electrodes TE1 and TE2 to be separated from the touch electrodes TE1 and TE2.

In an embodiment, the force sensor driver DFS may be supplied with a main power from the main power unit 810. In an embodiment, the force sensor driver DFS may be supplied with a first auxiliary power from the first auxiliary power unit 820.

The vehicle control system may include the force sensor FS, so that although the second touch unit 242 is damaged, the force sensor FS may be normally operated, and the user may partially have the right of control over the vehicle through the force sensor FS.

Figure 19:
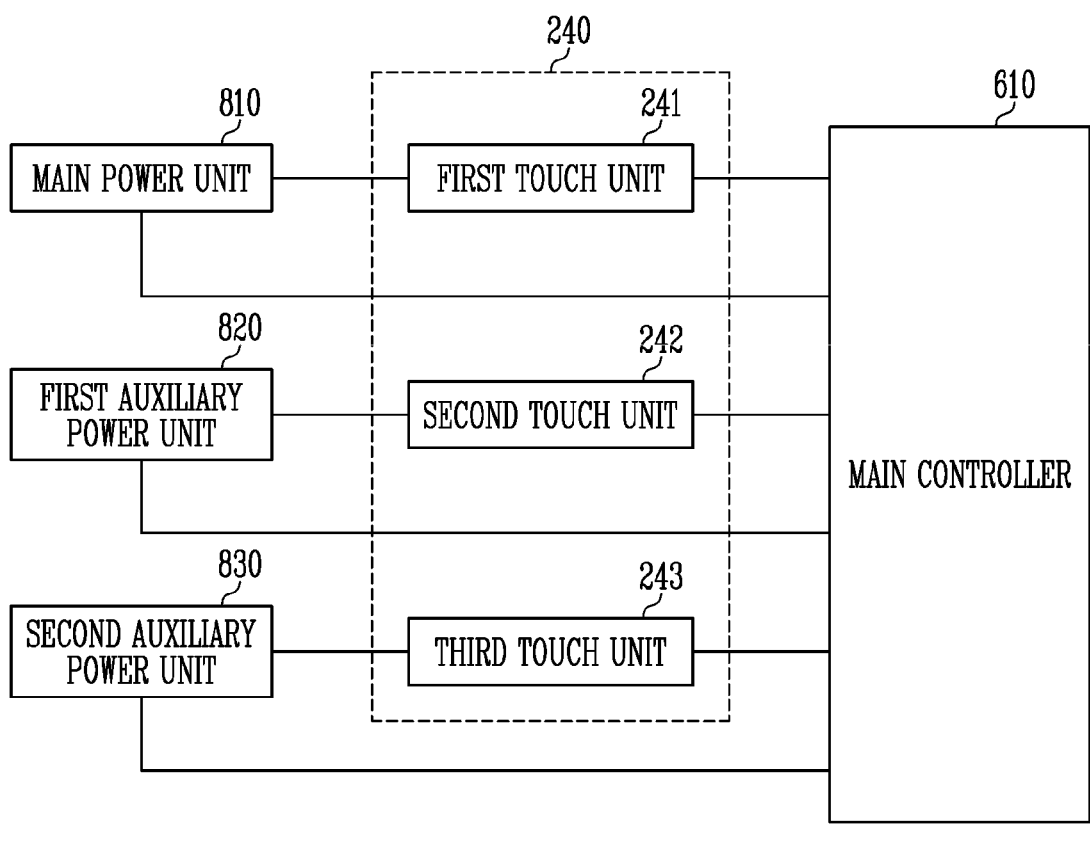
FIG. 19 is a schematic block diagram illustrating operations of a main power unit, a first auxiliary power unit, and a second auxiliary power unit of a vehicle control system in accordance with embodiments.
Figure 20:
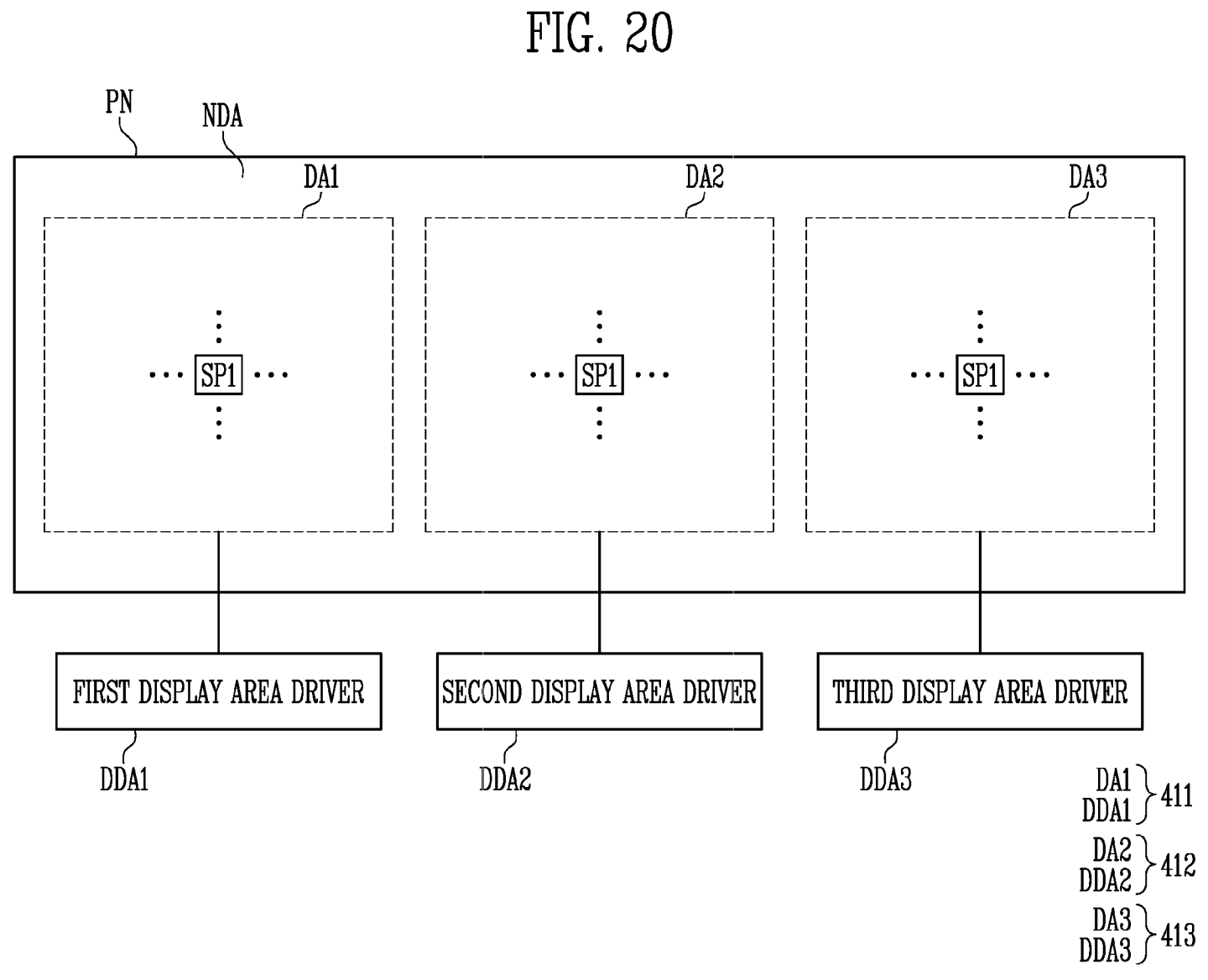
Figure 21:
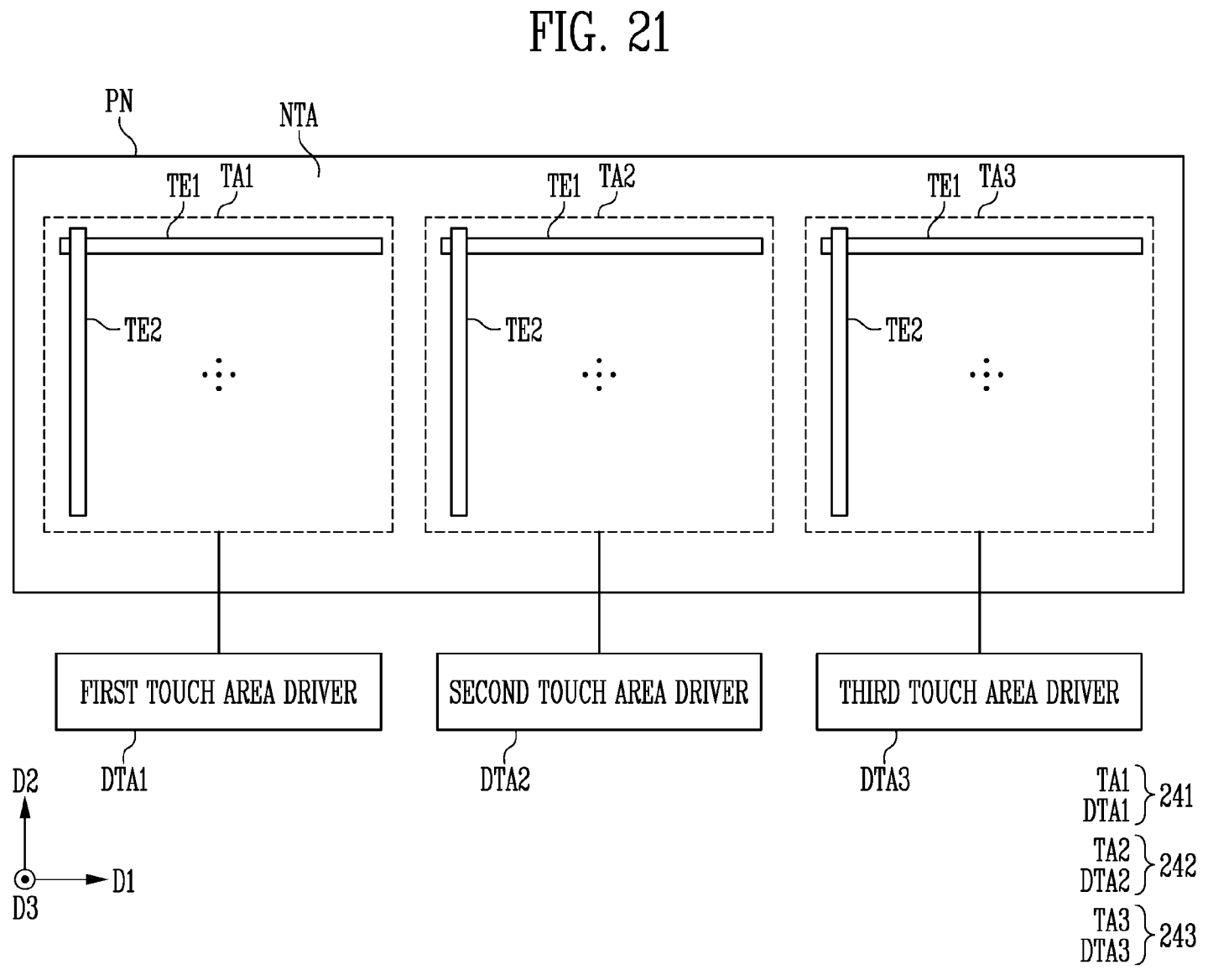

FIG. 19 is a schematic block diagram illustrating operations of a main power unit 810, a first auxiliary power unit 820, and a second auxiliary power unit 830 of a vehicle control system in accordance with embodiments. FIG. 20 is a schematic diagram illustrating an example of a first display unit 411, a second display unit 412, and a third display unit 413 of the vehicle control system shown in FIG. 19. FIG. 21 is a schematic diagram illustrating an example of a first touch unit 241, a second touch unit 242, and a third touch unit 243 of the vehicle control system shown in FIG. 19.

The vehicle control system in accordance with an embodiment may be formed as the vehicle control system 1000 shown in FIG. 2, except for the second auxiliary power unit 830, the third display unit 413, and the third touch unit 243. Therefore, components identical or similar to those described above are designated by like reference numerals, and the redundant descriptions will be omitted for descriptive convenience.

Referring to FIGS. 19, 20, and 21, the user input unit 240 may include the first touch unit 241, the second touch unit 242, and the third touch unit 243. The first touch unit 241, the second touch unit 242, and the third touch unit 243 may receive a touch of a user, and the main controller 610 may control the vehicle drive unit 500, based on the touch of the user.

The second auxiliary power unit 830 may supply a second auxiliary power to the third touch unit 243 and the main controller 610. For example, the second auxiliary power unit 830 may be supplied with a power from the battery inside the vehicle, or the like.

In an embodiment, the second auxiliary power unit 830 may supply a power to the third touch unit 243 under the control of the main controller 610. In an embodiment, the second auxiliary power unit 830 may supply a power to the third touch unit 243 without the control of the main controller 610.

In an embodiment, the first display unit 411, the second display unit 412, and the third display unit 413 may be supplied with a main power. In an embodiment, the first display unit 411 may be supplied with the main power, the second display unit 412 may be supplied with a first auxiliary power, and the third display unit 413 may be supplied with the second auxiliary power. In an embodiment, the second display unit 412 may be supplied with the first auxiliary power in the emergency mode which will be described below, the third display unit 413 may be supplied with the second auxiliary power in the emergency mode which will be described below, and the second display unit 412 and the third display unit 413 may be supplied with the main power in a mode except for the emergency mode.

As described above, the vehicle control system may supply powers from different power units to the first touch unit 241, the second touch unit 242, and the third touch unit 243. Accordingly, although the main power unit 810 is damaged, the second touch unit 242, the third touch unit 243, and the main controller 610 may be normally operated.

The vehicle control system may include a panel PN on which an image is displayed. The panel PN may include a first display area DA1 in which an image is displayed, a second display area DA2 in which the image is displayed, a third display area DA3 in which the image is displayed, and a non-display area NDA adjacent to the first display area DA1, the second display area DA2, and the third display area DA3. For example, the first display area DA1, the second display area DA2, and the third display area DA3 may include first sub-pixels SP1.

In an embodiment, the first display area DA1, the second display area DA2, and the third display area DA3 may share a window layer disposed above the panel PN. In an embodiment, the first display area DA1, the second display area DA2, and the third display area DA3 may have different display area drivers DDA1, DDA2, and DDA3 connected to the first sub-pixels SP1 thereof.

The vehicle control system may include a first display area driver DDA1 which drives first sub-pixels SP1 of the first display area DA1, a second display area driver DDA2 which drives first sub-pixels SP1 of the second display area DA2, and a third display area driver DDA3 which drives first sub-pixels SP1 of the third display area DA3.

The first display unit 411 may include the first display area DA1 and the first display area driver DDA1. The second display unit 412 may include the second display area DA2 and the second display area driver DDA2. The third display unit 413 may include the third display area DA3 and the third display area driver DDA3.

As described above, the vehicle control system may divisionally drive the display unit 410. Accordingly, although a display unit of the vehicle control system is damaged, an image may be displayed through another display unit which is not damaged.

In an embodiment, the vehicle control system may include three display units 411, 412, and 413. However, embodiments are not limited to the number of display units included in the display unit 410.

The third display area driver DDA3 may be substantially identical to the first display area driver DDA1, except that the third display area driver DDA3 drives the first sub-pixels SP1 of the third display area DA3, and therefore, the redundant descriptions will be omitted for descriptive convenience.

The vehicle control system may include a panel PN to which a touch of the user is input. The panel PN may include a first touch area TA1 which has at least a portion overlapping the first display area DA1 and receives a touch of the user, a second touch area TA2 which has at least a portion overlapping the second display area DA2 and receives the touch of the user, a third touch area TA3 which has at least a portion overlapping the third display area DA3 and receives the touch of the user, and a non-touch area NTA adjacent to the first touch area TA1, the second touch area TA2, and the third touch area TA3. For example, the first touch area TA1, the second touch area TA2, and the third touch area TA3 may include touch electrodes TE1 and TE2.

In an embodiment, the first touch area TA1, the second touch area TA2, and the third touch area TA3 may share a window layer disposed above the panel PN. In an embodiment, the first touch area TA1, the second touch area TA2, and the third touch area TA3 may have different touch area drivers DTA1, DTA2, and DTA3 connected to the touch electrodes TE1 and TE2 thereof.

The vehicle control system may include a first touch area driver DTA1 which drives touch electrodes TE1 and TE2 of the first touch area TA1, a second touch area driver DTA2 which drives touch electrodes TE1 and TE2 of the second touch area TA2, and a third touch area driver DTA3 which drives touch electrodes TE1 and TE2 of the third touch area TA3.

The first touch unit 241 may include the first touch area TA1 and the first touch area driver DTA1. The second touch unit 242 may include the second touch area TA2 and the second touch area driver DTA2. The third touch unit 243 may include the third touch area TA3 and the third touch area driver DTA3.

As described above, the vehicle control system may divisionally drive the touch units 241, 242, and 243. Accordingly, although a touch unit of the vehicle control system is damaged, the vehicle may be controlled through another touch unit which is not damaged.

In an embodiment, the vehicle control system may include three touch units 241, 242, and 243. However, embodiments are not limited to the number of touch units 241, 242, and 243.

The third touch area TA3 may be substantially identical to the first touch area TA1, and therefore, the redundant descriptions will be omitted for descriptive convenience.

Figure 22:
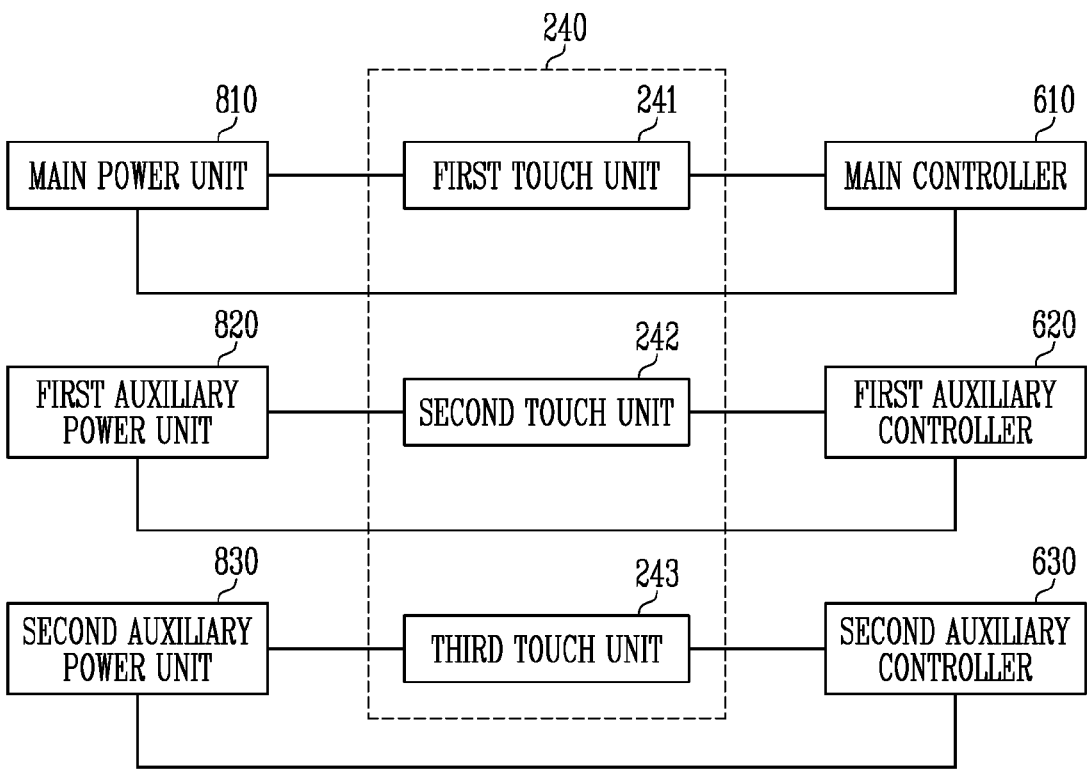
FIG. 22 is a schematic block diagram illustrating operations of a main power unit, a first auxiliary power unit, and a third auxiliary power unit of a vehicle control system in accordance with embodiments.
Figure 23:
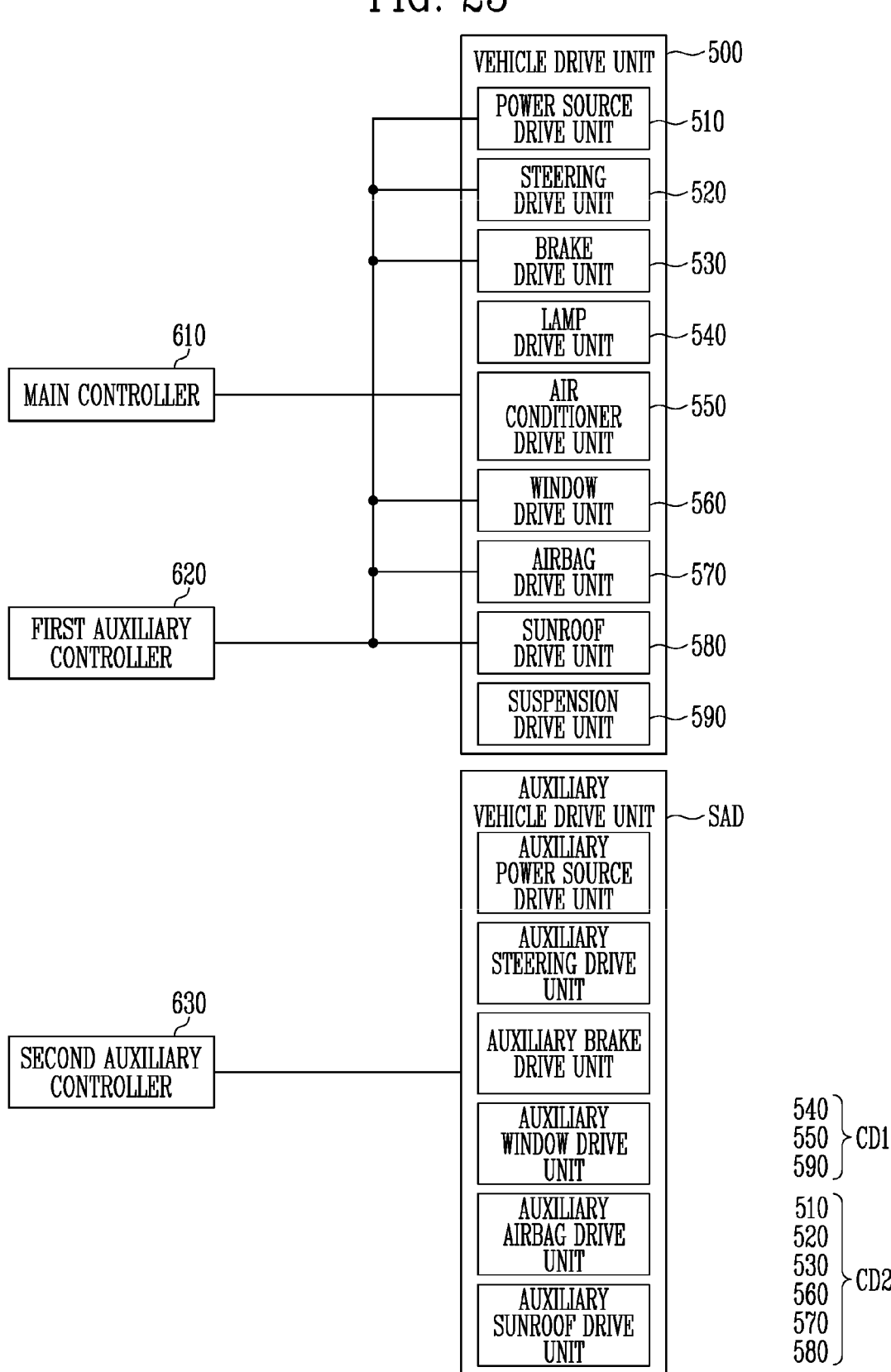
FIG. 23 is a schematic diagram illustrating an example of operations of a main controller, a first auxiliary controller, and a second auxiliary controller of the vehicle control system shown in FIG. 22.

FIG. 22 is a schematic block diagram illustrating operations of a main power unit 810, a first auxiliary power unit 820, and a third auxiliary power unit 830 of a vehicle control system in accordance with embodiments. FIG. 23 is a schematic diagram illustrating an example of operations of a main controller 610, a first auxiliary controller 620, and a second auxiliary controller 630 of the vehicle control system shown in FIG. 22.

The vehicle control system in accordance with an embodiment may be formed as the vehicle control system shown in FIG. 19, except for the first auxiliary controller 620 and the second auxiliary controller 630. Therefore, components identical or similar to those described above are designated by like reference numerals, and the redundant descriptions will be omitted for descriptive convenience.

Referring to FIGS. 22 and 23, in case that information is input through the second touch unit 242, the first auxiliary controller 620 may control an operation of the vehicle control system to correspond to the input information. In case that information is input through the third touch unit 243, the second auxiliary controller 630 may control an operation of the vehicle control system to correspond to the input information.

The first auxiliary power unit 820 may supply a first auxiliary power to the second touch unit 242 and the first auxiliary controller 620. The second auxiliary power unit 830 may supply a second auxiliary power to the third touch unit 243 and the second auxiliary controller 630. For example, the vehicle control system may supply powers from different power units to the first touch unit 241, the second touch unit 242, and the third touch unit 243, and supply the powers from the different power units to the main controller 610, the first auxiliary controller 620, and the second auxiliary controller 630. Accordingly, although the first touch unit 241 is damaged, the second touch unit 242, the third touch unit 243, the first auxiliary controller 620, and the second auxiliary controller 630 may be normally operated, and a user may control a vehicle through the second touch unit 242 or the third touch unit 243.

The vehicle drive unit 500 may include first vehicle drive units CD1 which drive first devices of the vehicle and second vehicle drive units CD2 which drive second devices of the vehicle, which are different from the first devices, and the first auxiliary controller 620 may control the second vehicle drive units CD2 in response to a touch of the user in the second touch unit 242.

The second devices may be devices for control in at least one of an emergency situation of the vehicle, an emergency situation of a driver, and an emergency situation of the driver and a first passenger. For example, the second devices may include at least one of a power source, a steering device, a brake device, a window device, an airbag device, and a sunroof device.

Accordingly, although the main power unit 810 or the first touch unit 241 is damaged, the second touch unit 242 and the first auxiliary controller 620 may be normally operated, and the user may partially have the right of control over the vehicle through the second touch unit 242.

The vehicle drive unit 500 may include first vehicle drive units CD1 which drive first devices of the vehicle and second vehicle drive units CD2 which drive second devices of the vehicle, which are different from the first devices, and the vehicle control system may further include an auxiliary vehicle drive unit SAD which drives the second devices, and the second auxiliary controller 630 which controls the auxiliary vehicle drive unit SAD in response to a touch of the user in the third touch unit 243.

In an embodiment, the auxiliary vehicle drive unit SAD may include at least one of an auxiliary power source drive unit substantially identical to the power source drive unit 510, an auxiliary steering drive unit substantially identical to the steering drive unit 520, an auxiliary brake drive unit substantially identical to the brake drive unit 530, an auxiliary window drive unit substantially identical to the window drive unit 560, an auxiliary airbag drive unit substantially identical to the airbag drive unit 570, and an auxiliary sunroof drive unit substantially identical to the sunroof drive unit 580.

In an embodiment, the auxiliary vehicle drive unit SAD may be supplied with the second auxiliary power from the second auxiliary power unit 830. Thus, although the main power unit 810 is damaged, the auxiliary vehicle drive unit SAD may be normally operated, and the user may partially have the authority of control over the vehicle through the third touch unit 243.

Figure 24:
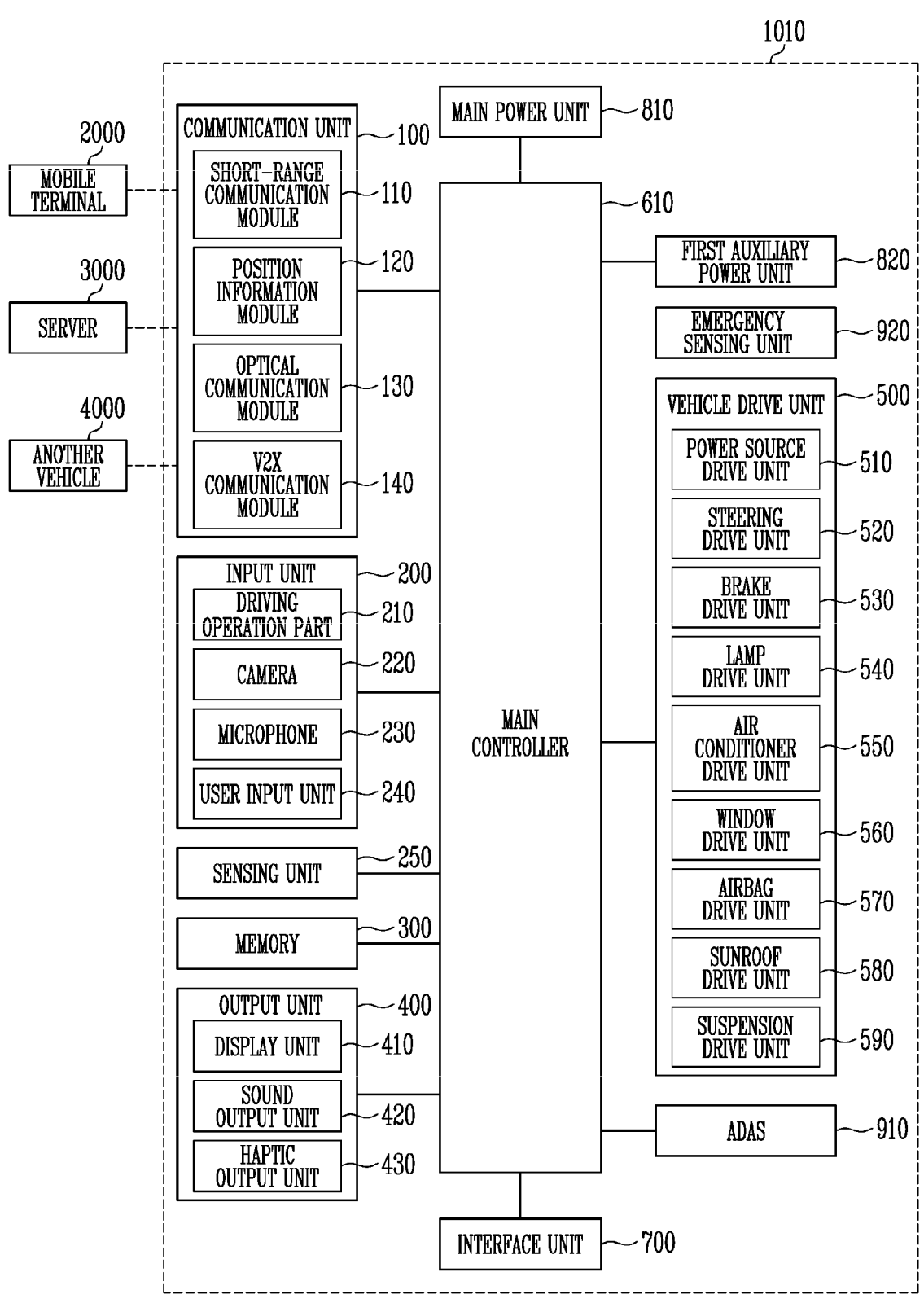
FIG. 24 is a schematic block diagram illustrating a vehicle control system in accordance with embodiments.
Figure 25:
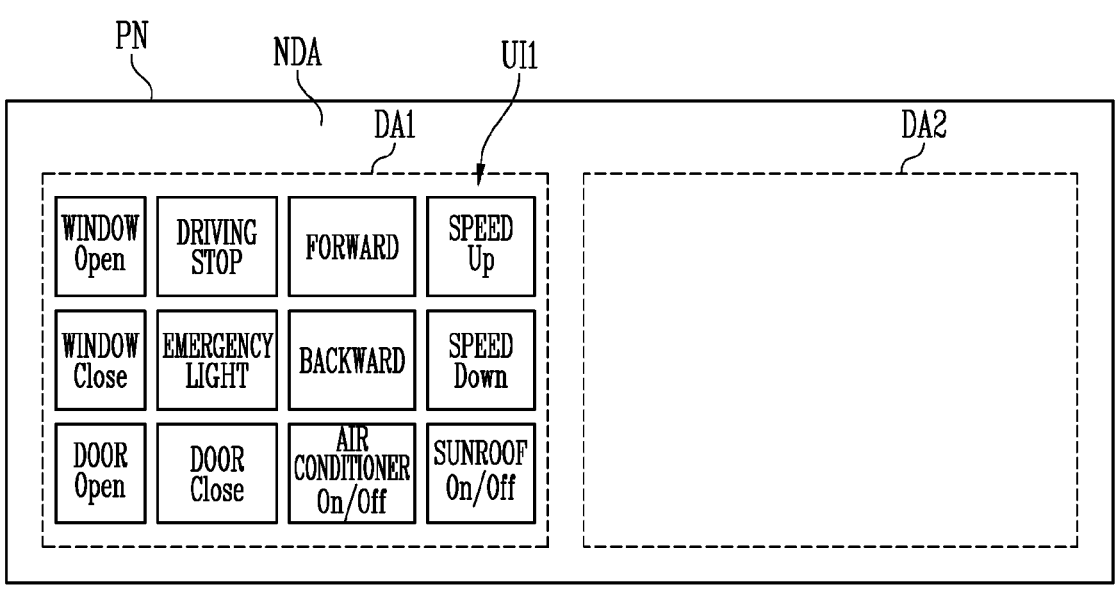
FIG. 25 is a schematic diagram illustrating an example of a first user interface and a second user interface of the vehicle control system shown in FIG. 24.
Figure 25:
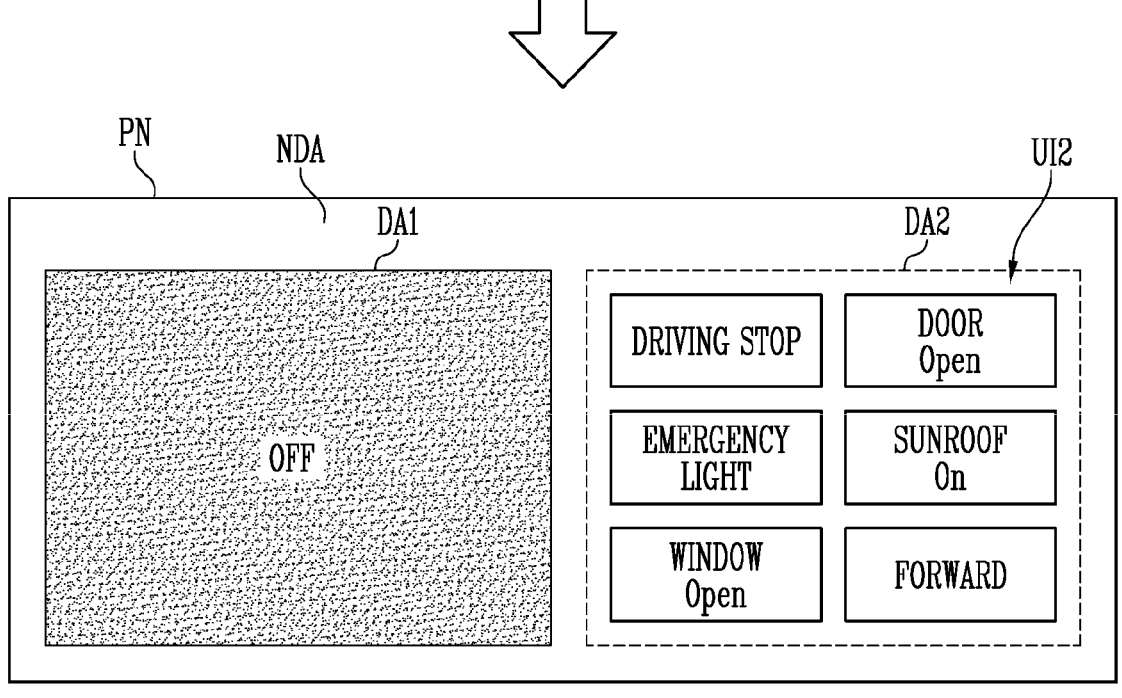

FIG. 24 is a schematic block diagram illustrating a vehicle control system 1010 in accordance with embodiments. FIG. 25 is a schematic diagram illustrating an example of a first user interface UI1 and a second user interface UI2 of the vehicle control system 1010 shown in FIG. 24.

The vehicle control system 1010 in accordance with an embodiment may be formed as the vehicle control system 1000 shown in FIG. 2, except for an emergency sensing unit 920 and an operation in the emergency mode. Therefore, components identical or similar to those described above are designated by like reference numerals, and the redundant descriptions will be omitted for descriptive convenience.

Referring to FIGS. 4, 24, and 25, the vehicle control system 1010 may include the emergency sensing unit 920 which enables a vehicle to be operated in the emergency mode, based on a state of the vehicle and a state of a driver of the vehicle.

In an embodiment, the emergency sensing unit 920 may sense an emergency situation of the vehicle or an emergency situation of the driver, thereby informing the main controller 610 of the sensed emergency situation, and the main controller 610 may be operated in the emergency mode under the emergency situation of the vehicle or the emergency situation of the driver.

In an embodiment, the emergency sensing unit 920 may sense a state of the vehicle, based on whether each component of the vehicle control system 1010 is normally operated. In an embodiment, the emergency sensing unit 920 may receive an image from the camera 220, and sense a state of the vehicle or a state of the driver of the vehicle, based on the image. In an embodiment, the emergency sensing unit 920 may receive a sensing signal from the sensing unit 250, and may sense a state of the vehicle or a state of the driver of the vehicle, based on the sensing signal.

For example, in case that a portion of the display unit 410 of the vehicle is not operated, the emergency sensing unit 920 may enable the vehicle to be operated in the emergency mode. For example, in case that some components of the vehicle are not normally operated, the emergency sensing unit 920 may enable the vehicle to be operated in the emergency mode. For example, in case that the driver is in an inoperable state, the emergency sensing unit 920 may enable the vehicle to be operated in the emergency mode.

The first display unit 411 may display the first user interface UI1 including driving switches in the first display area DA1, and the second display unit 412 may display the second user interface UI2 different from the first user interface UI1 in the emergency mode of the vehicle. For example, the second display unit 412 may display switches (e.g., switches associated with a radio, an audio, and the like) irrelevant to driving of the vehicle in case that the mode of the vehicle is not the emergency mode, and display the second user interface UI2 in case that the mode of vehicle is the emergency mode.

For example, the driving switches may include at least one of a 'Window Open' switch for opening a window device, a 'Window Close' switch for closing the window device, a 'Door Open' switch for opening a door, a 'Door Close' switch for closing the door, an 'Emergency Light' switch for turning on an emergency light, a 'Driving Stop' switch for stopping the vehicle, a 'Forward' switch for moving the vehicle forward, a 'Backward' switch for moving the vehicle backward, an 'Air Conditioner On/Off' switch for turning on/off an air conditioner, a 'Speed Up' switch for increasing the speed of the vehicle, a 'Sped Down' switch for decreasing the speed of the vehicle, and a 'Sunroof On/Off' switch for turning on/off a sunroof device.

In an embodiment, the second user interface UI2 may include some of the driving switches. A portion of the display unit 410 may not be operated in an emergency situation. Therefore, the size of the second user interface UI2 may be minimized, and the second user interface UI2 may include only driving switches required in the emergency situation.

For example, the second user interface UI2 may include at least one of the 'Window Open' switch for opening the window device, the 'Door Open' switch for opening the door, an 'Emergency Light' switch for turning on the emergency light, the 'Driving Stop' switch for stopping the vehicle, the 'Forward' switch for moving the vehicle forward, and the 'Sunroof On/Off' switch for turning on/off the sunroof device.

In an embodiment, the vehicle control system 1010 may include the emergency sensing unit 920 which enables the vehicle to be operated in the emergency mode, based on a state of the driver and a state of a first passenger. For example, in case that the driver and the first passenger are in an emergency situation (e.g., an inoperable state), the emergency sensing unit 920 may enable the vehicle to be operated in the emergency mode in which a display area (e.g., the second display area DA2 shown in FIGS. 8 and 9) close to backseats of the vehicle (e.g., a second passenger and a third passenger) and a touch unit are driven.

Figure 26:
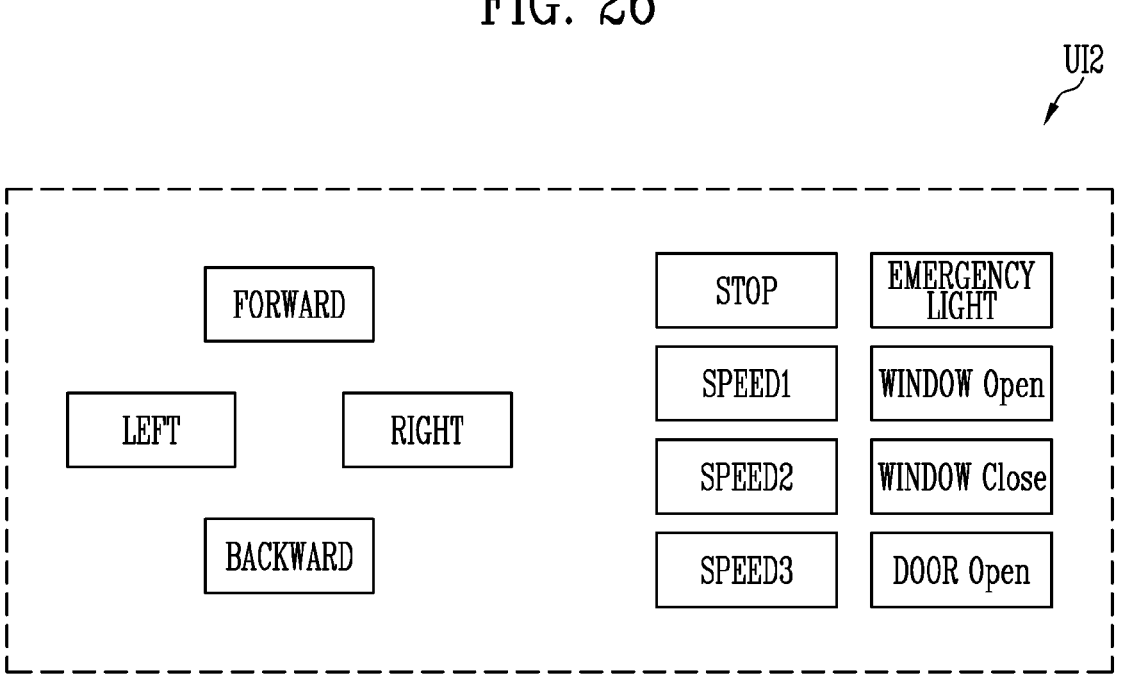
FIG. 26 is a schematic diagram illustrating a second user interface of a vehicle control system in accordance with embodiments.

FIG. 26 is a schematic diagram illustrating a second user interface UI2 of a vehicle control system in accordance with embodiments.

The vehicle control system in accordance with an embodiment may be formed as the vehicle control system 1010 shown in FIG. 24, except for the second user interface UI2. Therefore, components identical or similar to those described above are designated by like reference numerals, and the redundant descriptions will be omitted for descriptive convenience.

Referring to FIG. 26, the second user interface UI2 may include only driving switches required in an emergency situation. For example, the second user interface UI2 may include at least one of a 'Forward' switch for moving the vehicle forward, a 'Left' switch for turning the vehicle left, a 'Right' switch for turning the vehicle right, a 'Backward' switch for moving the vehicle backward, a 'Stop' switch for stopping the vehicle, an 'Emergency Light' switch for turning on an emergency light, a 'Speed1' switch for setting the speed of the vehicle to a certain first speed, a 'Speed2' switch for setting the speed of the vehicle to a certain second speed, a 'Speed3' switch for setting the speed of the vehicle to a certain third speed, a 'Window Open' switch for opening a window device, a 'Window Close' switch for closing the window device, and a 'Door Open' switch for opening a door.

Figure 27:
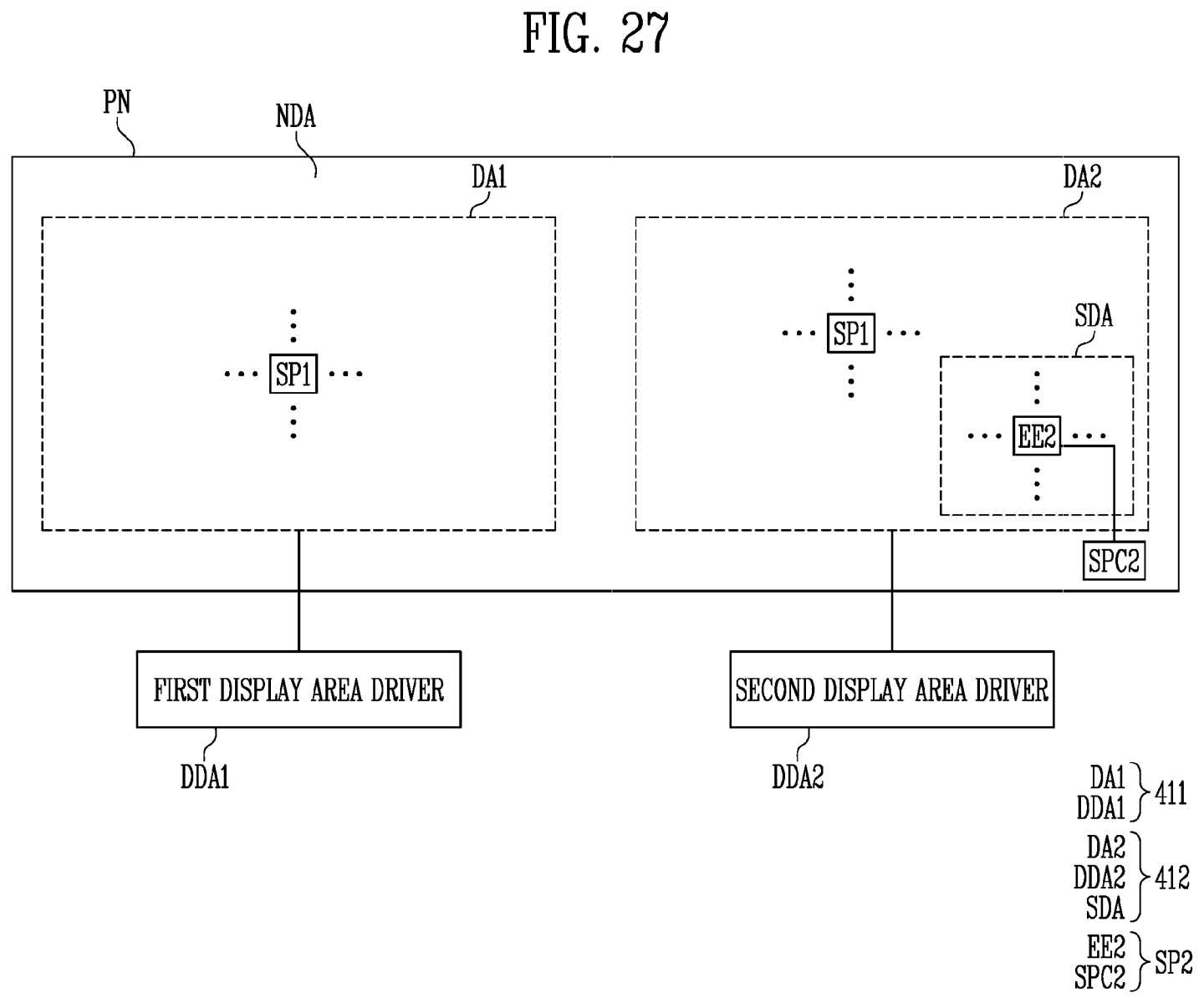

FIG. 27 is a schematic diagram illustrating a first display unit 411 and a second display unit 412 of a vehicle control system in accordance with embodiments.

The vehicle control system in accordance with an embodiment may be formed as the vehicle control system 1010 shown in FIG. 24, except for an auxiliary display area SDA and an operation in the emergency mode. Therefore, components identical or similar to those described above are designated by like reference numerals, and the redundant descriptions will be omitted for descriptive convenience.

Referring to FIGS. 24 and 27, the second display unit 412 may include the auxiliary display area SDA including second light emitting elements EE2 of second sub-pixels SP2, driven in the emergency mode. The auxiliary display area SDA may be included in the second display area DA2.

The second sub-pixel SP2 may include a second light emitting element EE2 and a second pixel driving circuit SPC2 which drives the second light emitting element EE2. The second sub-pixel SP2 may be substantially identical to the first sub-pixel SP1, except for positions of the second light emitting element EE2 and the second pixel driving circuit SPC2, and therefore, the redundant descriptions will be omitted for descriptive convenience.

In an embodiment, second pixel driving circuits SPC2 may be disposed in the non-display area NDA. Although circuits included in the second display area DA2 are damaged, the second light emitting element EE2 and a line connecting the second light emitting element EE2 and the second pixel driving circuit SPC2 to each other may be normally operated. Accordingly, the vehicle control system may display an image in the auxiliary display area SDA.

In an embodiment, the vehicle control system may display, in the auxiliary display area SDA, driving switches required in at least one of an emergency situation of a vehicle, an emergency situation of a driver, and an emergency situation of the driver and a first passenger. For example, the second user interface shown in FIGS. 25 and 26 may be displayed.

In an embodiment, the second display unit 412 may include an auxiliary display area driver which drives the second sub-pixels SP2 separately from the second display area driver DDA2. The auxiliary display area driver may be substantially identical to the second display area driver DDA2, except that the auxiliary display area driver drives the second sub-pixels SP2.

Figure 28:
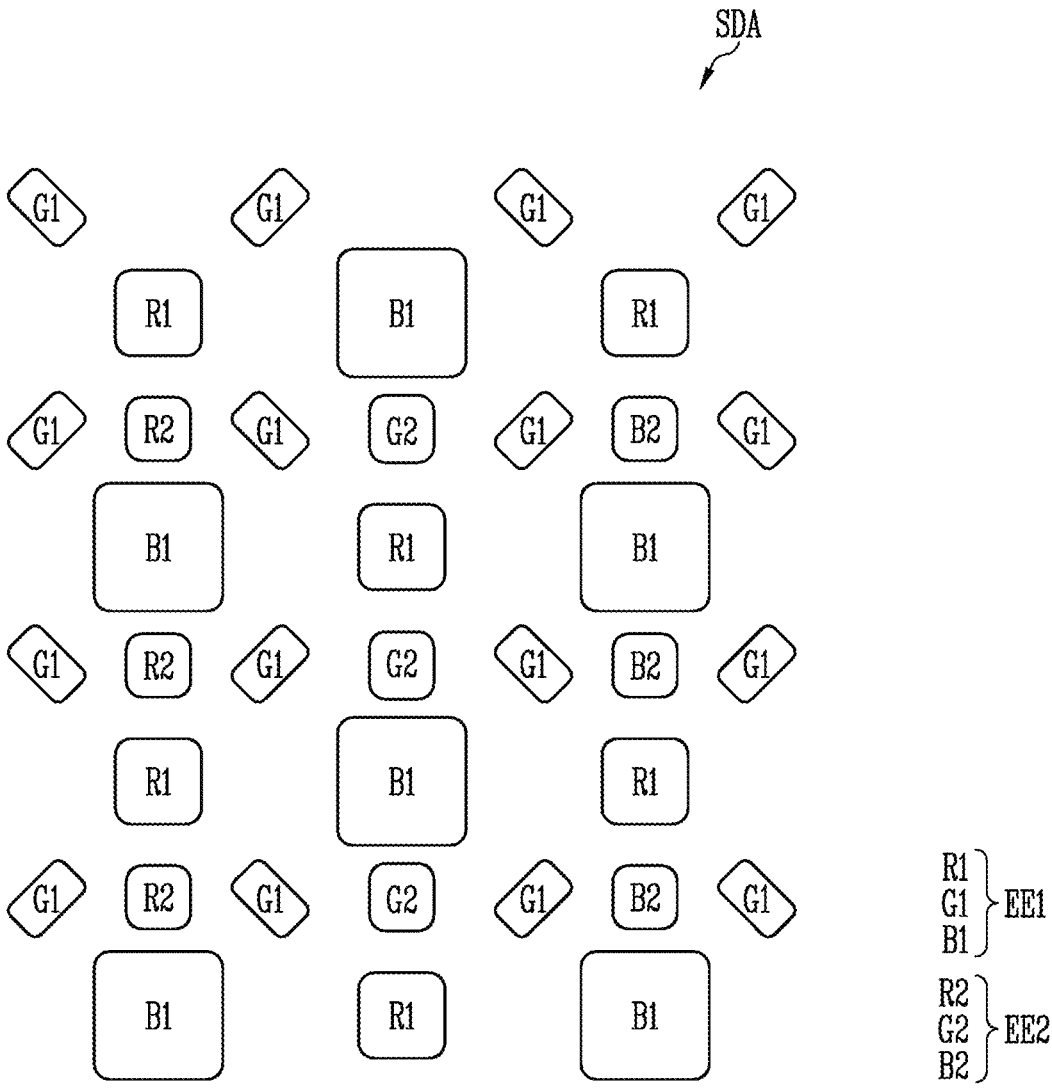
FIGS. 28 and 29 are schematic diagrams illustrating an example of an auxiliary display area of the vehicle control system shown in FIG. 27.
Figure 29:
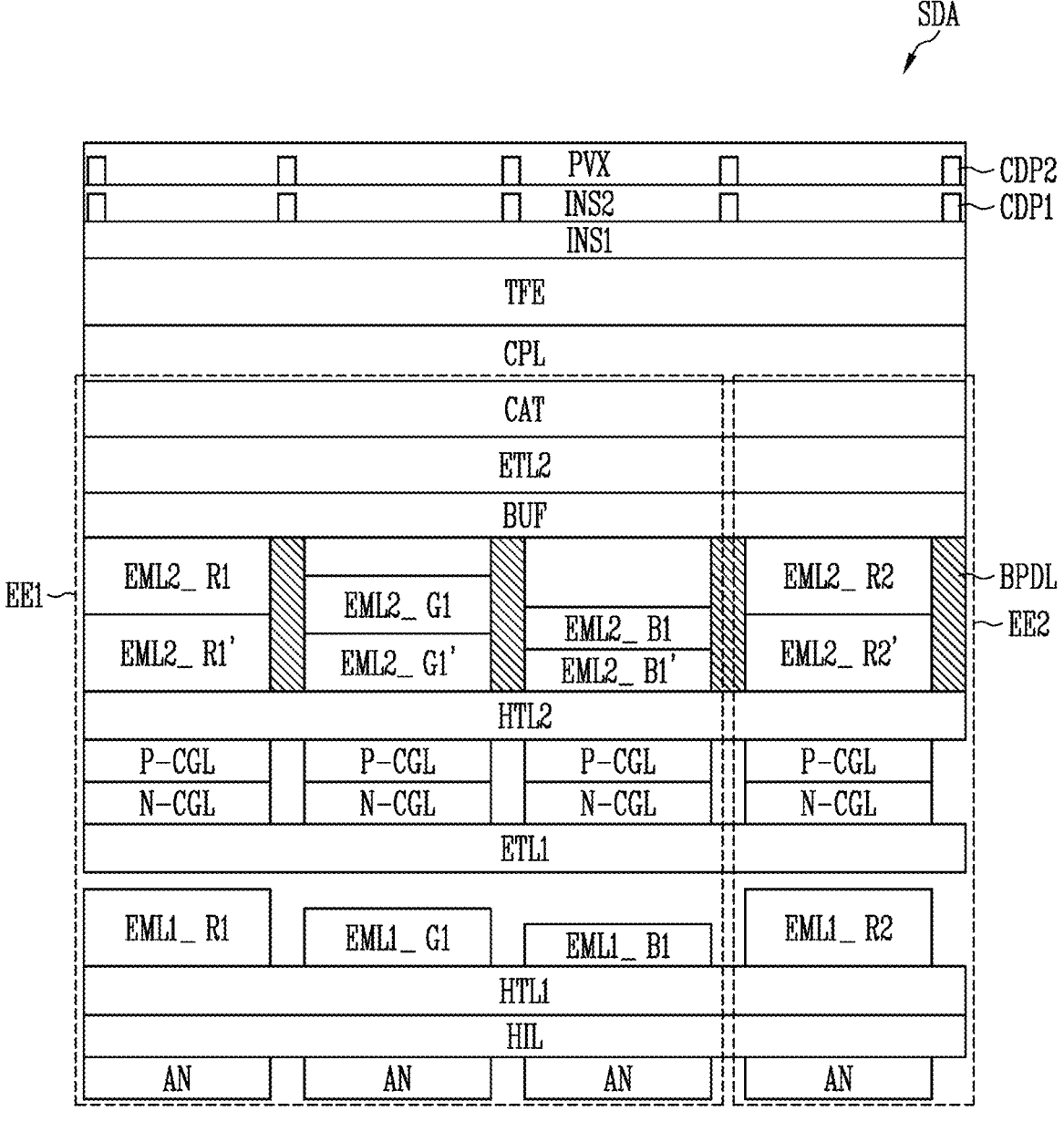

FIGS. 28 and 29 are schematic diagrams illustrating an example of the auxiliary display area SDA of the vehicle control system shown in FIG. 27.

For convenience of description, second light emitting elements G2 and B2 emitting light a second color and light of a third color are omitted in FIG. 29.

Referring to FIGS. 10, 28, and 29, each of second light emitting elements EE2 may be disposed between first light emitting elements EE1 of first sub-pixels SP1. For example, each of the second light emitting elements EE2 may be disposed instead of a sensing diode (e.g., a photo diode) at a position at which the sensing diode is positioned.

For example, as shown in FIG. 28, in the first light emitting elements EE1, first light emitting elements R1 emitting light of a first color and first light emitting elements B1 emitting light of a third color may be alternately disposed, and first light emitting elements G1 emitting light of a second color may be disposed between the first light emitting elements R1 emitting light of the first color or between the first light emitting elements B1 emitting light of the third color. For example, the second light emitting elements EE2 may be disposed between the first light emitting element R1 emitting light of the first color and the first light emitting element B1 emitting light of the third color. For example, second light emitting elements R2 emitting light of the first color may be disposed on a first column, second light emitting elements G2 emitting light of the second color may be disposed on a second column adjacent to the first column, and second light emitting elements B2 emitting light of the third color may be disposed on a third column adjacent to the second column.

However, embodiments are not limited to the arrangement of the first light emitting elements EE1 and the second light emitting elements EE2.

For example, as shown in FIG. 29, the auxiliary display area SDA may include an anode electrode AN, a hole injection layer HIL, a first hole transport layer HTL1, a first light emitting layer EML1_R1, EML1_G1, EML1_B1, and EML1_R2, a first electron transport layer ETL1, an N-type charge generation layer N-CGL, a P-type charge generation layer P-CGL, a second hole transport layer HTL2, a second light emitting layer EML2_R1, EML2_G1, EML2_B1, and EML2_R2, an auxiliary light emitting layer EML2_R1', EML2_G1', EML2_B1', and EML2_R2', a pixel defining layer BPDL, a buffer layer BUF, a second electron transport layer ETL2, a cathode electrode CAT, a capping layer CPL, an encapsulation layer TFE, a first insulating layer INS1, a second insulating layer INS2, a protective layer PVX, a first conductive pattern layer CDP1, and a second conductive pattern layer CDP2.

The anode electrode AN may be an electrode which supplies holes to the first light emitting layer EML1_R1, EML1_G1, EML1_B1, and EML1_R2. The hole injection layer HIL disposed on the anode electrode AN may function such that holes may be smoothly injected into the first light emitting layer EML1_R1, EML1_G1, EML1_B1, and EML1_R2.

The first hole transport layer HTL1 may be disposed on the hole injection layer HIL. The first hole transport layer HTL1 may smoothly transfer holes from the hole injection layer HIL to the first light emitting layer EML1_R1, EML1_G1, EML1_B1, and EML1_R2.

The first light emitting layer EML1_R1, EML1_G1, EML1_B1, and EML1_R2 may be disposed on the first hole transport layer HTL1. The first light emitting layer EML1_R1, EML1_G1, EML1_B1, and EML1_R2 may include a first light emitting layer EML1_R1 of the first light emitting element R1 emitting light of the first color, a first light emitting layer EML1_G1 of the first light emitting element G1 emitting light of the second color, a first light emitting layer EML1_B1 of the first light emitting element B1 emitting light of the third color, a first light emitting layer EML1_R2 of the second light emitting element R2 emitting light of the first color, a first light emitting layer of the second light emitting element G2 emitting light of the second color, and a first light emitting layer of the second light emitting element B2 emitting light of the third color.

In the first light emitting layer EML1_R1, EML1_G1, EML1_B1, and EML1_R2, holes supplied from the anode electrode AN and electrons supplied from the cathode electrode CAT may be recombined to form excitons. For example, light may be emitted while the excitons are stabilized. The first light emitting layer EML1_R1, EML1_G1, EML1_B1, and EML1_R2 may include a material emitting light of a specific color.

The first electron transport layer ETL1 may be formed on the first light emitting layer EML1_R1, EML1_G1, EML1_B1, and EML1_R2. The first electron transport layer ETL1 may be supplied with electrons from the N-type charge generation layer N-CGL. The first electron transport layer ETL1 may transfer the supplied electrons to the first light emitting layer EML1_R1, EML1_G1, EML1_B1, and EML1_R2.

The N-type charge generation layer N-CGL may inject electrons into the first light emitting layer EML1_R1, EML1_G1, EML1_B1, and EML1_R2. For example, the N-type charge generation layer N-CGL may include an N-type dopant material and an N-type host material.

The P-type charge generation layer P-CGL may inject holes into the second light emitting layer EML2_R1, EML2_G1, EML2_B1, and EML2_R2. The P-type charge generation layer P-CGL may include a P-type dopant material and a P-type host material.

The second hole transport layer HTL2 may be disposed on the P-type charge generation layer P-CGL. The second hole transport layer HTL2 may smoothly transfer holes from the P-type charge generation layer P-CGL to the second light emitting layer EML2_R1, EML2_G1, EML2_B1, and EML2_R2.

The auxiliary light emitting layer EML2_R1', EML2_G1', EML2_B1', and EML2_R2' may be disposed on the second hole transport layer HTL2. The auxiliary light emitting layer EML2_R1', EML2_G1', EML2_B1', and EML2_R2' may improve the light emission efficiency of the second light emitting layer EML2_R1, EML2_G1, EML2_B1, and EML2_R2.

The second light emitting layer EML2_R1, EML2_G1, EML2_B1, and EML2_R2 may be disposed on the auxiliary light emitting layer EML2_R1', EML2_G1', EML2_B1', and EML2_R2'. The second light emitting layer EML2_R1, EML2_G1, EML2_B1, and EML2_R2 may include a second light emitting layer EML2_R1 of the first light emitting element R1 emitting light of the first color, a second light emitting layer EML2_G1 of the first light emitting element G1 emitting light of the second color, a second light emitting layer EML2_B1 of the first light emitting element B1 emitting light of the third color, a second light emitting layer EML2_R2 of the second light emitting element R2 emitting light of the first color, a second light emitting layer of the second light emitting element G2 emitting light of the second color, and a second light emitting layer of the second light emitting element B2 emitting light of the third color.

Holes supplied from the second light emitting layer EML2_R1, EML2_G1, EML2_B1, and EML2_R2 to the anode electrode AN and electrons supplied from the cathode electrode CAT may be recombined to form excitons. For example, light may be emitted while the excitons are stabilized. The second light emitting layer EML2_R1, EML2_G1, EML2_B1, and EML2_R2 may include a material emitting light of a specific color. The pixel defining layer BPDL may define the second light emitting layer EML2_R1, EML2_G1, EML2_B1, and EML2_R2 and a position of the second light emitting layer EML2_R1, EML2_G1, EML2_B1, and EML2_R2.

The buffer layer BUF may be disposed on the second light emitting layer EML2_R1, EML2_G1, EML2_B1, and EML2_R2. The buffer layer BUF may minimize infiltration (or permeation) of moisture or an impurity.

The second electron transport layer ETL2 may be disposed on the buffer layer BUF. The cathode electrode CAT may be an electrode an electrode which supplies electrons to the second light emitting layer EML2_R1, EML2_G1, EML2_B1, and EML2_R2. The second electron transport layer ELT2 may be supplied with electrons from the cathode electrode CAT. The second electron transport layer ELT2 may transfer the supplied electrons to the second light emitting layer EML2_R1, EML2_G1, EML2_B1, and EML2_R2.

The capping layer CPL may be disposed on the cathode electrode CAT. The capping layer CPL may include a moisture absorbent or a particle for light extraction.

The encapsulation layer TFE may be disposed on the capping layer CPL. The encapsulation layer TFE may be disposed to cover the entire surface of the second display area DA2.

The first insulating layer INS1 may be disposed on the encapsulation layer TFE. The first insulating layer INS1 may form a base layer of the conductive pattern layers CDP1 and CDP2.

The second insulating layer INS2 may be disposed on the first insulating layer INS1. The first conductive pattern layer CDP1 and the second conductive pattern layer CDP2 may be spaced apart from each other with the second insulating layer INS2 interposed therebetween.

The first conductive pattern layer CDP1 and the second conductive pattern layer CDP2 may be patterned in an area, to form touch electrodes TE1 and TE2. For example, a portion of the first conductive pattern layer CDP1 may form a first touch electrode TE1, and a portion of each of the first conductive pattern layer CDP1 and the second conductive pattern layer CDP2 may form a second touch electrode TE2. For example, a portion of the second conductive pattern layer CDP2 may form a first touch electrode TE1, and a portion of each of the first conductive pattern layer CDP1 and the second conductive pattern layer CDP2 may form a second touch electrode TE2.

However, embodiments are not limited thereto. For example, the first touch electrode TE1 and the second touch electrode TE2 may be formed in different layers.

The protective layer PVX may be disposed on the second insulating layer INS2. For example, the protective layer PVX may be a passivation layer.

However, embodiments are not limited to the structure of the auxiliary display area SDA.

Figure 30:
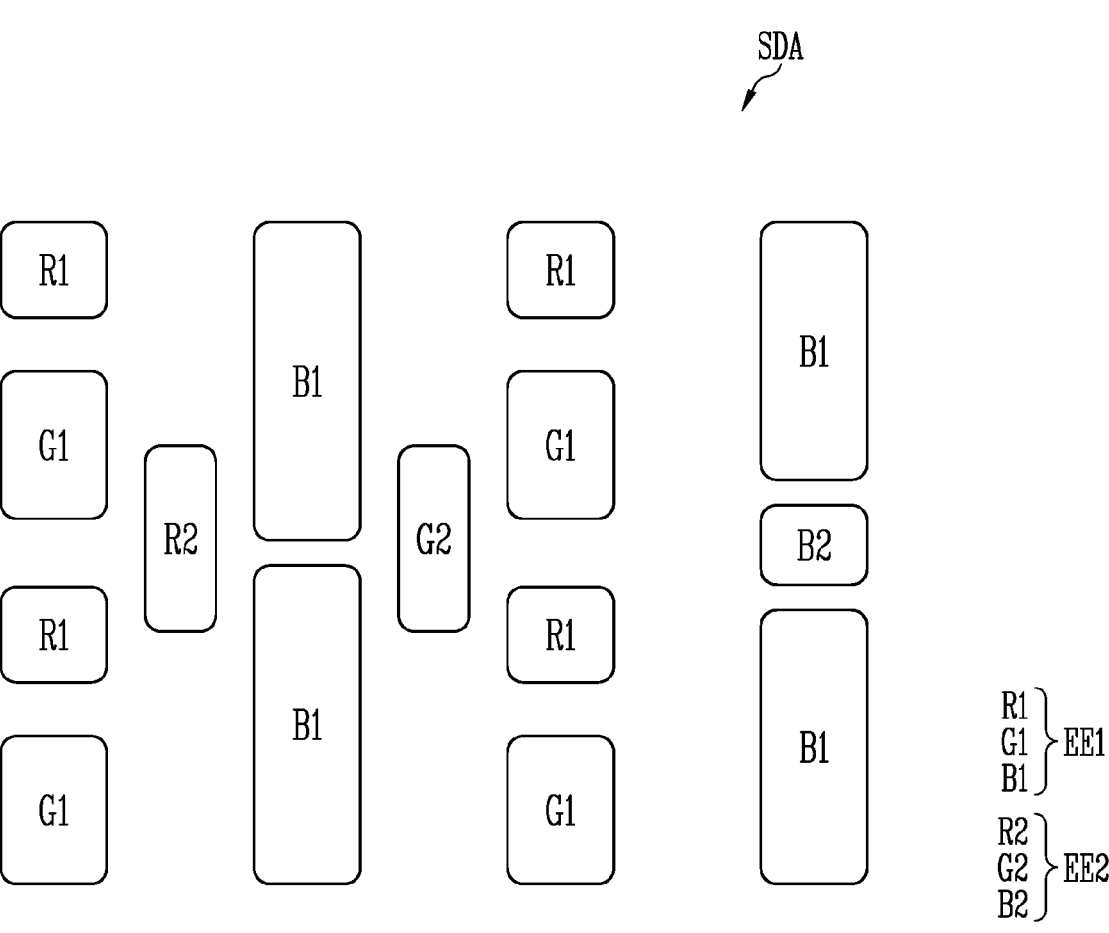
FIG. 30 is a schematic diagram illustrating an auxiliary display area of a vehicle control system in accordance with embodiments.

FIG. 30 is a schematic diagram illustrating an auxiliary display area SDA of a vehicle control system in accordance with embodiments.

The vehicle control system in accordance with an embodiment may be formed as the vehicle control system shown in FIG. 27, except for an arrangement of first light emitting elements EE1 and second light emitting elements EE2. Therefore, components identical or similar to those described above are designated by like reference numerals, and the redundant descriptions will be omitted for descriptive convenience.

Referring to FIG. 30, each of second light emitting elements EE2 may be disposed between first light emitting elements EE1 of first sub-pixels SP1.

For example, as shown in FIG. 30, in the first light emitting elements EE1, first light emitting elements R1 emitting light of a first color and first light emitting elements G1 emitting light of a second color may be alternately disposed on a first column, and first light emitting elements B1 emitting light of a third color may be disposed on a second column adjacent to the first column.

For example, second light emitting elements R2 and G2 emitting light of the first color and the second color may be disposed between the column on which the first light emitting elements R1 emitting light of the first color and the first light emitting elements G1 emitting light of the second color are disposed and the column on which the first light emitting elements B1 emitting light of the third color are disposed.

For example, second light emitting elements B2 emitting light of the third color may be disposed between the first light emitting elements B1 emitting light of the third color.

For example, the first light emitting elements B1 emitting light of the third color on a column on which the second light emitting element B2 emitting light of the third color are disposed may have an areas smaller than an area of the first light emitting elements B1 emitting light of the third color on a column on which the second light emitting elements B2 emitting light of the third color are not disposed.

However, embodiments are not limited to the arrangement of the first light emitting elements EE1 and the second light emitting elements EE2.

Figure 31:
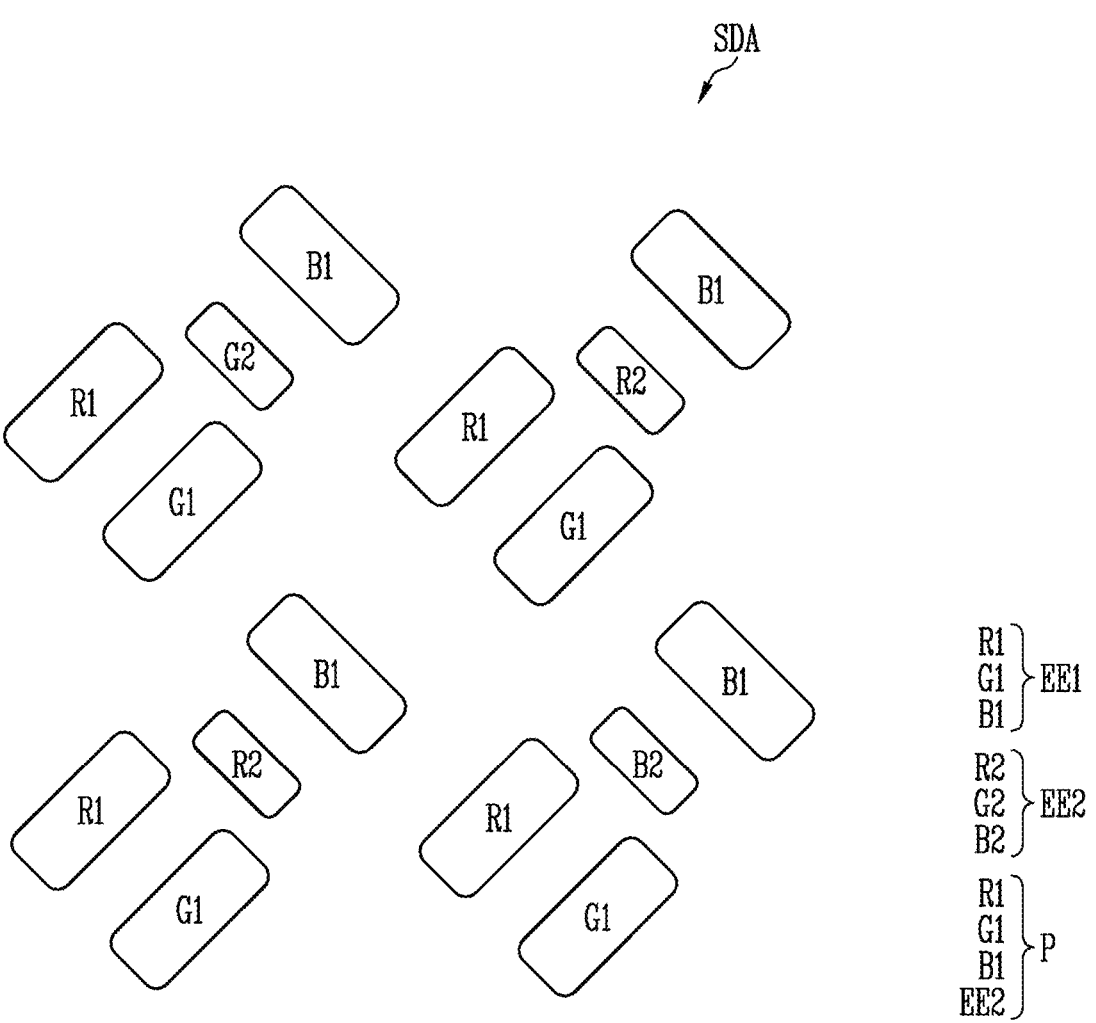
FIG. 31 is a schematic diagram illustrating an auxiliary display area of a vehicle control system in accordance with embodiments of the present disclosure.

FIG. 31 is a schematic diagram illustrating an auxiliary display area SDA of a vehicle control system in accordance with embodiments.

The vehicle control system in accordance with an embodiment may be formed as the vehicle control system shown in FIG. 27, except for an arrangement of first light emitting elements EE1 and second light emitting elements EE2. Therefore, components identical or similar to those described above are designated by like reference numerals, and the redundant descriptions will be omitted for descriptive convenience.

Referring to FIG. 31, each of second light emitting elements EE2 may be disposed between first light emitting elements EE1 of first sub-pixels SP1.

In an embodiment, a pixel P may include a first light emitting element R1 emitting light of a first color, a first light emitting element G2 emitting light of a second color, a first light emitting element B1 emitting light of a third color, and a second light emitting element EE2.

For example, as shown in FIG. 31, a pixel P may include a first light emitting element R1 emitting light of the first color, a first light emitting element G2 emitting light of the second color, and a first light emitting element B1 emitting light of the third color. For example, the pixel P may include one of a second light emitting element R2 emitting light of the first color, a second light emitting element G2 emitting light of the second color, and a second light emitting element B2 emitting light of the third color. For example, in the pixel (or single pixel) P, a second light emitting element EE2 may be disposed between the first light emitting element R1 emitting light of the first color and the first light emitting element G1 emitting light of the second color, and the first light emitting element B1 emitting light of the third color.

However, embodiments are not limited to the arrangement of the first light emitting elements EE1 and the second light emitting elements EE2.

Figure 32:
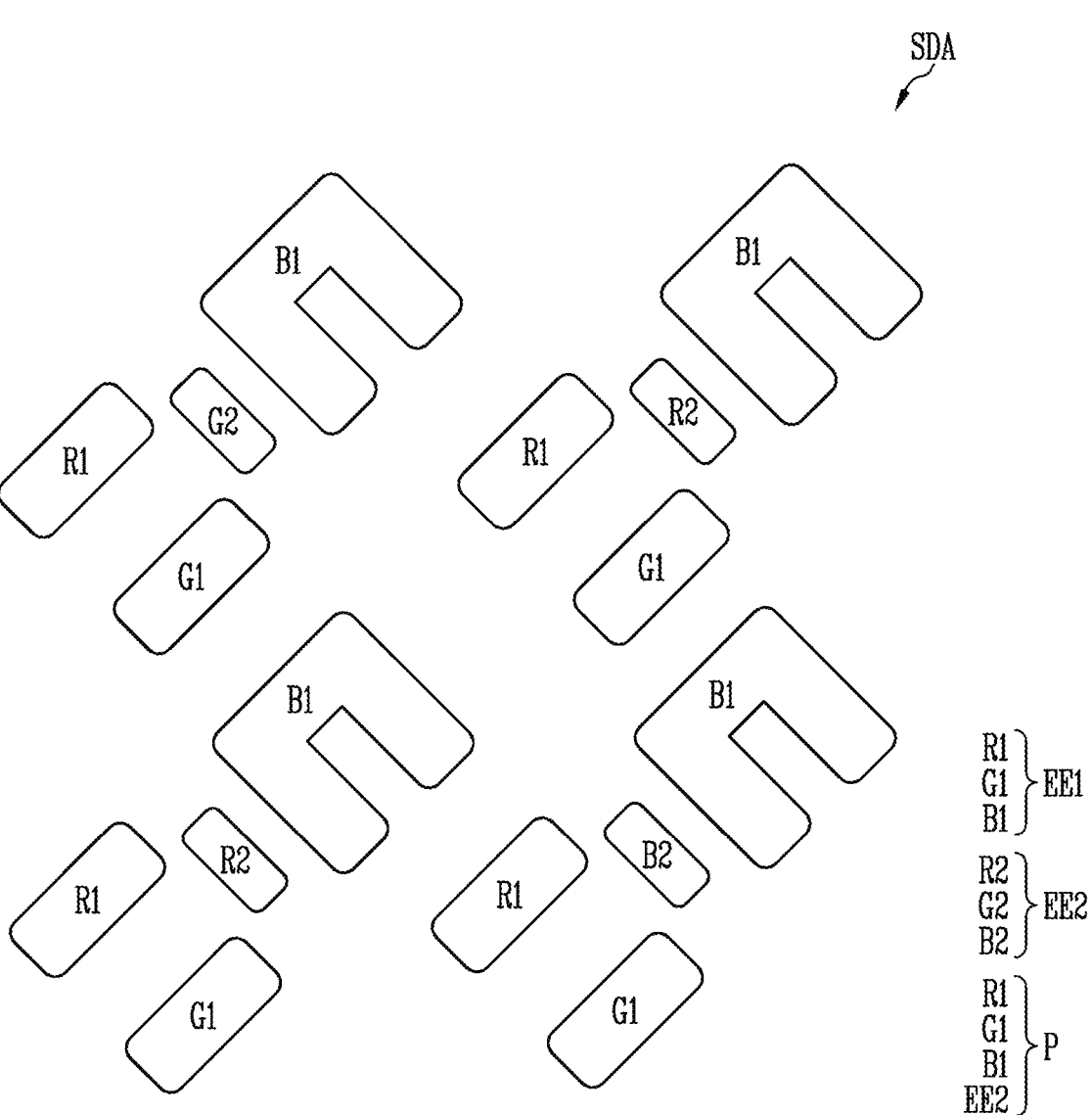
FIG. 32 is a schematic diagram illustrating an auxiliary display area of a vehicle control system in accordance with embodiments of the present disclosure.

FIG. 32 is a schematic diagram illustrating an auxiliary display area SDA of a vehicle control system in accordance with embodiments.

The vehicle control system in accordance with an embodiment may be formed as the vehicle control system shown in FIG. 27, except for an arrangement of first light emitting elements EE1 and second light emitting elements EE2. Therefore, components identical or similar to those described above are designated by like reference numerals, and the redundant descriptions will be omitted for descriptive convenience.

Referring to FIG. 32, each of second light emitting elements EE2 may be disposed between first light emitting elements EE1 of first sub-pixels SP1.

In an embodiment, a pixel P may include a first light emitting element R1 emitting light of a first color, a first light emitting element G2 emitting light of a second color, a first light emitting element B1 emitting light of a third color, and a second light emitting element EE2.

For example, as shown in FIG. 32, a pixel P may include a first light emitting element R1 emitting light of the first color, a first light emitting element G2 emitting light of the second color, and a '⊏'-shaped first light emitting element B1 emitting light of the third color. For example, the pixel (or single pixel) P may include one of a second light emitting element R2 emitting light of the first color, a second light emitting element G2 emitting light of the second color, and a second light emitting element B2 emitting light of the third color. For example, in the pixel (or single pixel) P, a second light emitting element EE2 may be disposed between the first light emitting element R1 emitting light of the first color and the first light emitting element G1 emitting light of the second color, and the first light emitting element B1 emitting light of the third color.

However, embodiments are not limited to the arrangement of the first light emitting elements EE1 and the second light emitting elements EE2.

Figure 33:
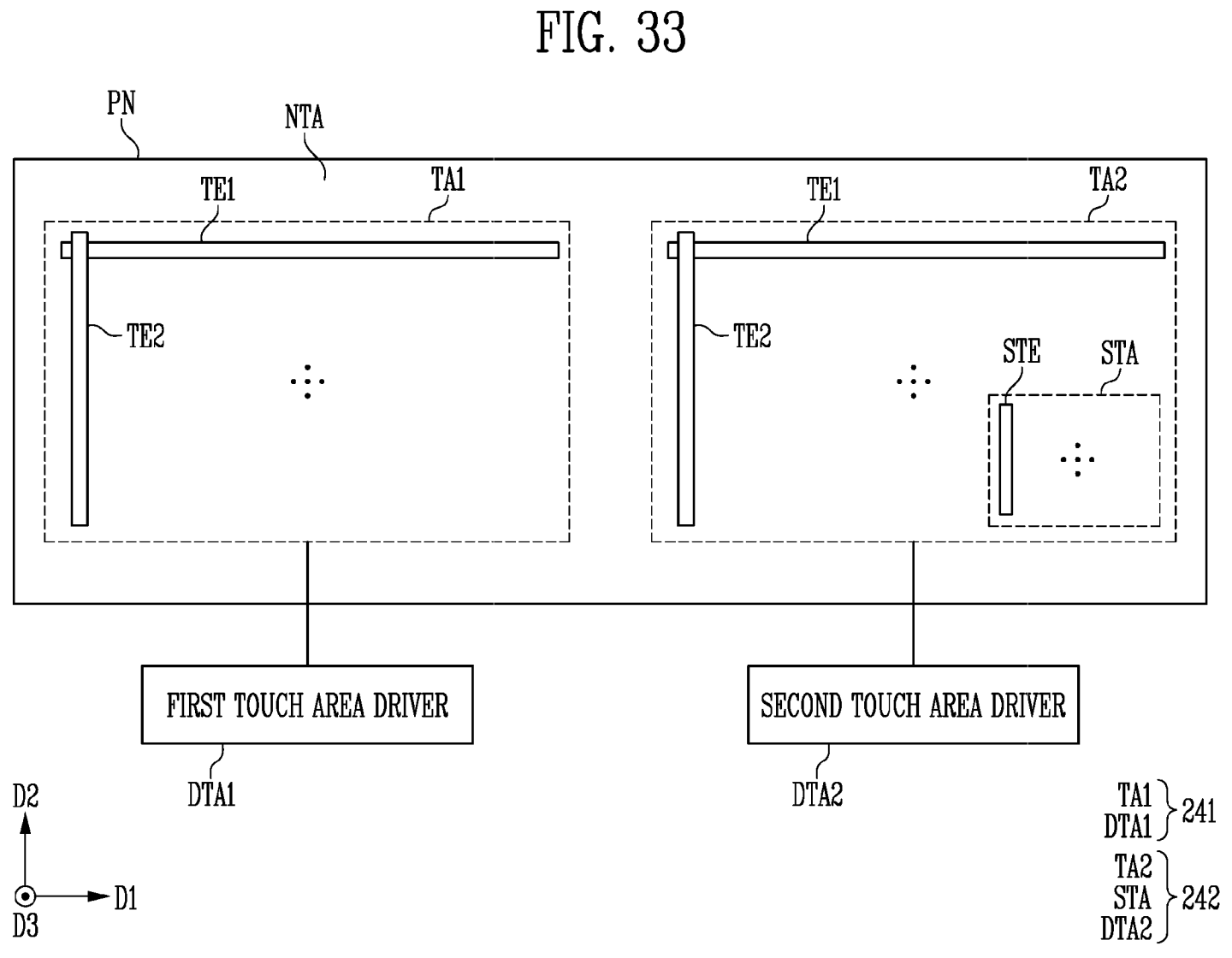
Figure 34:
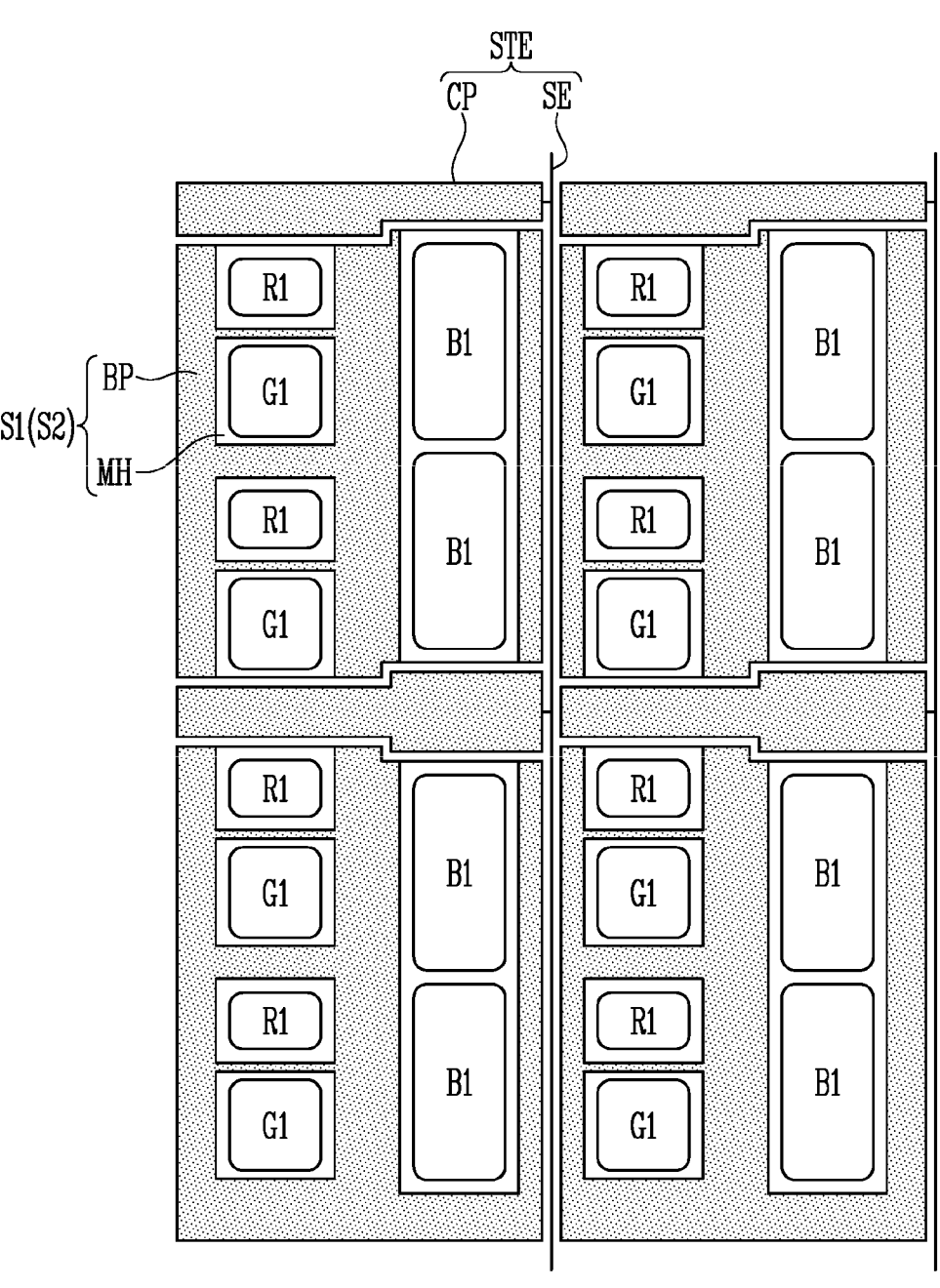
FIG. 34 is a schematic diagram illustrating an example of an auxiliary touch electrode of the vehicle control system shown in FIG. 33.

FIG. 33 is a schematic diagram illustrating a first touch unit 241 and a second touch unit 242 of a vehicle control system in accordance with embodiments. FIG. 34 is a schematic diagram illustrating an example of an auxiliary touch electrode STE of the vehicle control system shown in FIG. 33.

The vehicle control system in accordance with an embodiment may be formed as the vehicle control system 1010 shown in FIG. 24, except for an auxiliary touch area STA and an operation in the emergency mode. Therefore, components identical or similar to those described above are designated by like reference numerals, and the redundant descriptions will be omitted for descriptive convenience.

Referring to FIGS. 24 and 33, the second touch unit 242 may include the auxiliary touch area STA including auxiliary touch electrodes STE to which a touch of a user is input in the emergency mode. The auxiliary touch area STA may be included in the second touch area TA2. In an embodiment, the auxiliary touch area STA may overlap the auxiliary display area shown in FIG. 27.

Referring to FIGS. 11, 12, 13, 33, and 34, in an embodiment, at least one of the auxiliary touch electrodes STE may include a portion which is cut from at least one of the touch electrodes TE1 and TE2 to be separated from the touch electrodes TE1 and TE2.

The auxiliary touch electrode STE may include a cutting part CP and an auxiliary connection electrode SE. The cutting part CP may be a portion which is cut from the touch electrodes TE1 and TE2 to be separated from the touch electrodes TE1 and TE2. The auxiliary connection electrode SE may connect cutting parts CP to each other.

The auxiliary touch area STA may be driven in a self-capacitance method. Each of the cutting parts CP may form a self-capacitor. In the self-capacitance method, the second touch area driver DTA2 may provide self-sensing signals to the auxiliary touch electrodes STE in the emergency mode, and the self-capacitor of each of the auxiliary touch electrodes STE may be charged. For example, in case that an object (e.g., a finger of a person, or the like) approaches the auxiliary touch area STA, a capacitance of each of the auxiliary touch electrodes STE may be changed. The second touch area driver DTA2 may detect whether a touch is input and/or a coordinate of the touch, based on the changed capacitance.

Referring to FIG. 33, in an embodiment, at least one of the auxiliary touch electrodes STE may be a force sensor. For example, each of the auxiliary touch electrodes STE may be a strain gauge. The vehicle control system may further include a force sensor driver for driving the auxiliary touch electrodes STE.

Although the touch electrodes TE1 and TE2 are damaged, the auxiliary touch electrodes STE may be normally operated. Accordingly, the vehicle control system may receive a touch of the user through the auxiliary touch area STA.

The vehicle control system may be implemented on a computer-readable recording medium as a computer-readable code. Computer-readable recording mediums may include every kind of recording device that stores computer system-readable data. Hard Disk Drives (HDDs), Solid State Disks (SSDs), Silicon Disk Drives (SDDs), ROMs, RAMs, CD-ROMs, magnetic tapes, floppy discs, optical data storage, etc. may be used as a computer-readable recording medium. Computer-readable recording mediums may also be implemented in the form of a carrier wave (e.g., transmission through the internet).

In accordance with the disclosure, the vehicle control system may divisionally drive a display unit. Accordingly, although a display unit is damaged, the vehicle control system may display an image through another display unit.

In accordance with the disclosure, the vehicle control system may divisionally drive a touch unit. Accordingly, although a touch unit is damaged, the vehicle control system may receive a touch of a user through another touch unit.

In accordance with the disclosure, the vehicle control system may include an auxiliary display area. Accordingly, although a display unit is damaged, the vehicle control system may display an image through the auxiliary display area.

In accordance with the disclosure, the vehicle control system may include an auxiliary touch area. Accordingly, although a touch unit is damaged, the vehicle control system may receive a touch of the user through the auxiliary touch area.

In concluding the detailed description, those skilled in the art will appreciate that many variations and modifications may be made to the embodiments without substantially departing from the principles and spirit and scope of the disclosure. Therefore, the disclosed embodiments are used in a generic and descriptive sense only and not for purposes of limitation.

What is claimed is:

1. A vehicle control system comprising:
a first display unit including a first display area configured to display an image;
a first touch unit including a first touch area, the first touch area including at least a portion overlapping the first display area, the first touch unit configured to receive a touch of a user;
a second display unit including a second display area configured to display the image;
a second touch unit including a second touch area, the second touch area including at least a portion overlapping the second display area, the second touch unit configured to receive the touch of the user;
a vehicle drive unit configured to drive a vehicle;
a main controller configured to control the vehicle drive unit based on the touch of the user;
a main power unit configured to supply a main power to the first touch unit and the main controller; and
a first auxiliary power unit configured to supply a first auxiliary power to the second touch unit.

2. The vehicle control system of claim 1, wherein the first display area is closer to a driver seat of the vehicle than the second display area.

3. The vehicle control system of claim 1, wherein the first display area is integral with the vehicle, and

the second display area is an electronic device that is separated from the vehicle.

4. The vehicle control system of claim 1, wherein the vehicle drive unit includes:

first vehicle drive units configured to drive first devices of the vehicle; and second vehicle drive units configured drive second devices of the vehicle, the second devices being different from the first devices, the vehicle control system further comprises a first auxiliary controller configured to control the second vehicle drive units in response to the touch of the user detected by the second touch unit.

5. The vehicle control system of claim 4, wherein the second devices include at least one of a power source, a steering device, a brake device, a window device, an airbag device, or a sunroof device.

6. The vehicle control system of claim 4, wherein the first auxiliary power unit is configured to supply the first auxiliary power to the first auxiliary controller.

7. The vehicle control system of claim 1, wherein the vehicle drive unit includes:

first vehicle drive units configured to drive first devices of the vehicle; and second vehicle drive units that drive second devices of the vehicle, the second devices being different from the first devices, and the vehicle control system further comprises:

an auxiliary vehicle drive unit configured to drive the second devices; and a first auxiliary controller configured to control the auxiliary vehicle drive unit in response to the touch of the user detected by the second touch unit.

8. The vehicle control system of claim 1, wherein the first display unit further includes a first display area driver configured to drive first sub-pixels of the first display area, and the second display unit further includes a second display area driver configured to drive first sub-pixels of the second display area,

the first touch unit further includes a first touch area driver configured to drive first touch electrodes of the first touch area, and the second touch unit further includes a second touch area driver configured to drive second touch electrodes of the second touch area.

9. The vehicle control system of claim 1, wherein the second touch unit includes:

a force sensor in at least a portion of the second touch area; and a force sensor driver configured to drive the force sensor.

10. The vehicle control system of claim 9, wherein the second display unit is configured to display an emergency switch in a portion of the second display area, which overlaps the at least a portion of the second touch area.

11. The vehicle control system of claim 1, further comprising:

a third display unit including a third display area configured to display the image;

a third touch unit including a third touch area that includes at least a portion overlapping the third display area and is configured to receive the touch of the user; and a second auxiliary power unit configured to supply a second auxiliary power to the third touch unit.

12. The vehicle control system of claim 1, further comprising:

an emergency sensing unit configured to enable the vehicle to be operated in an emergency mode, based on at least one of a state of the vehicle or a state of a driver of the vehicle.

13. The vehicle control system of claim 12, wherein the first display unit is configured to display a first user interface including driving switches in the first display area, and the second display unit is configured to display a second user interface, which is different from the first user interface in the emergency mode of the vehicle.

14. The vehicle control system of claim 13, wherein the second user interface includes some of the driving switches.

* * * * *